INVENTORS
EDWARD W. COLLINS
AND MARTIN L. CARPENTER
BY
*Spencer Hardman & Fehr*
*their* ATTORNEYS May 5, 1942. E. W. COLLINS ET AL 2,281,917
ARMATURE ASSEMBLING MACHINE
Filed April 17, 1940 15 Sheets-Sheet 5

INVENTORS
EDWARD W. COLLINS
AND MARTIN L. CARPENTER
their ATTORNEYS

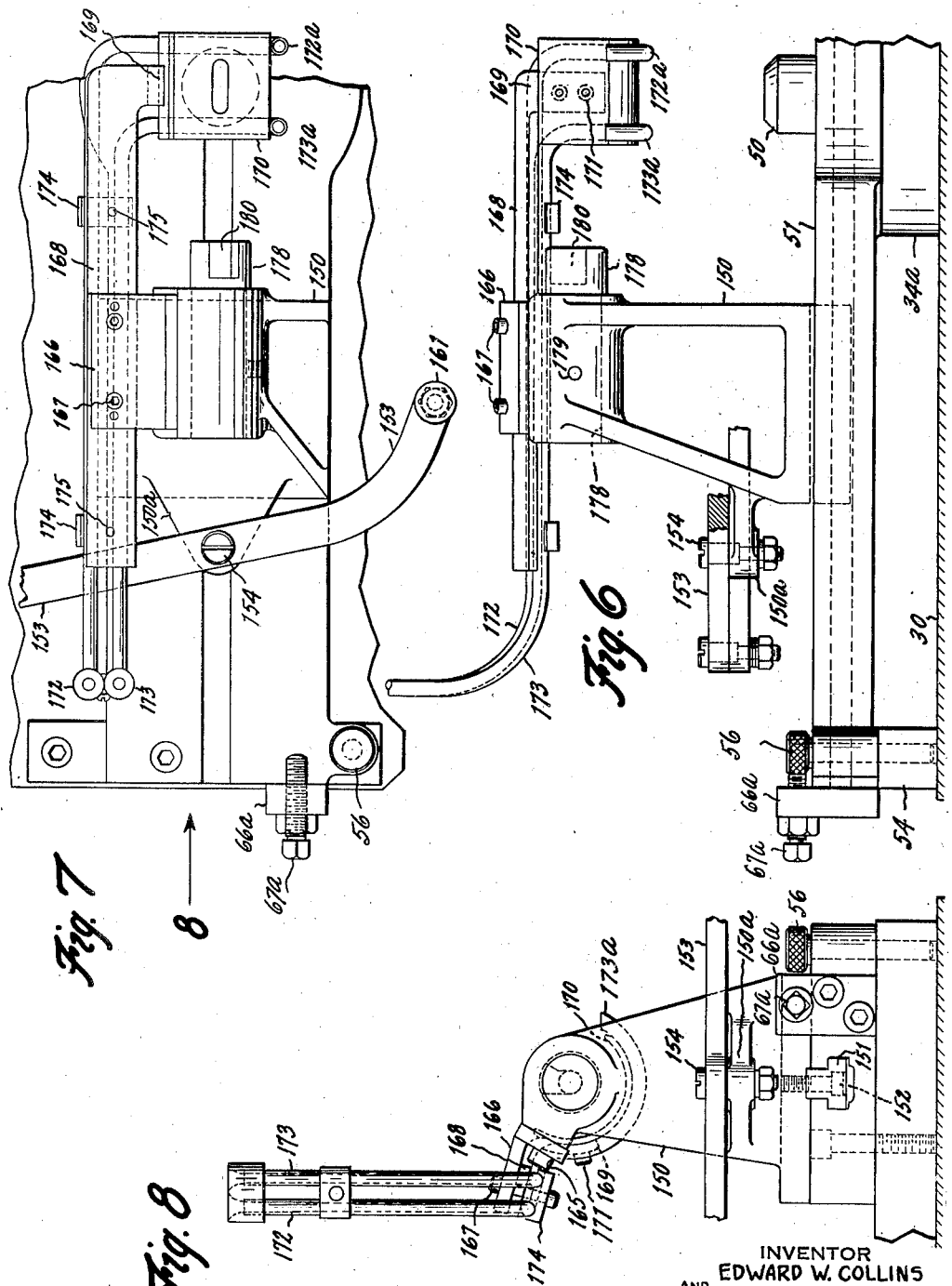

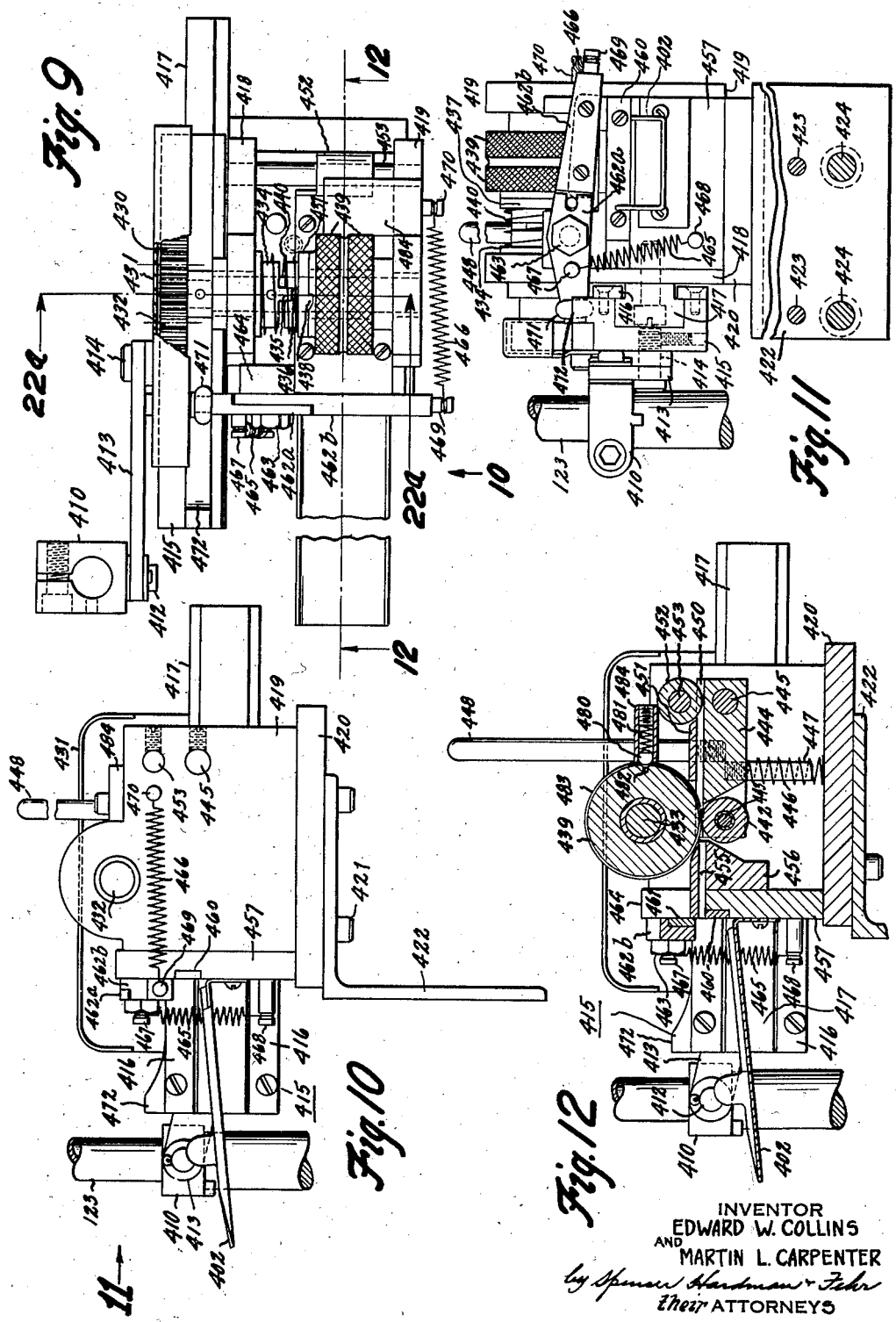

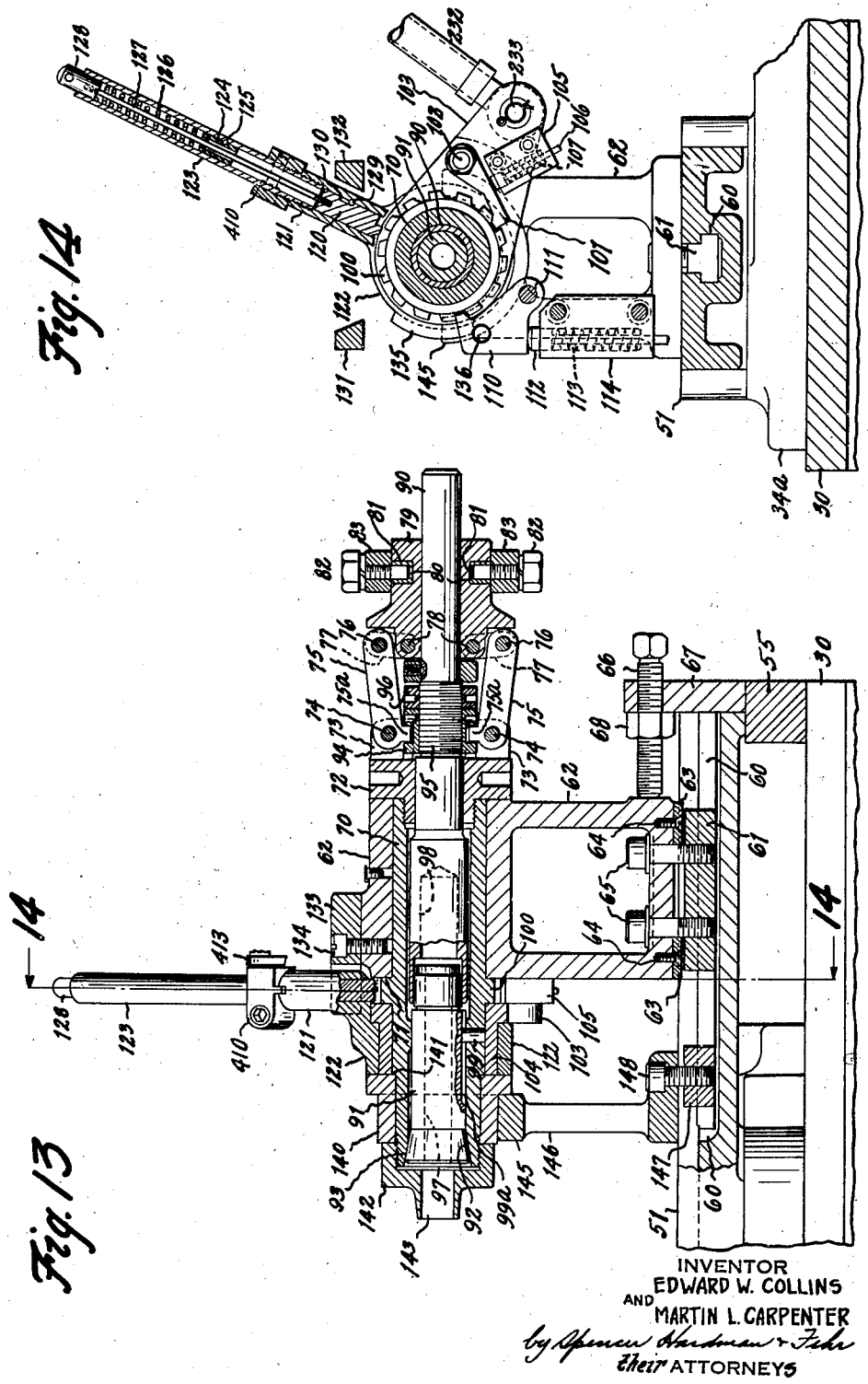

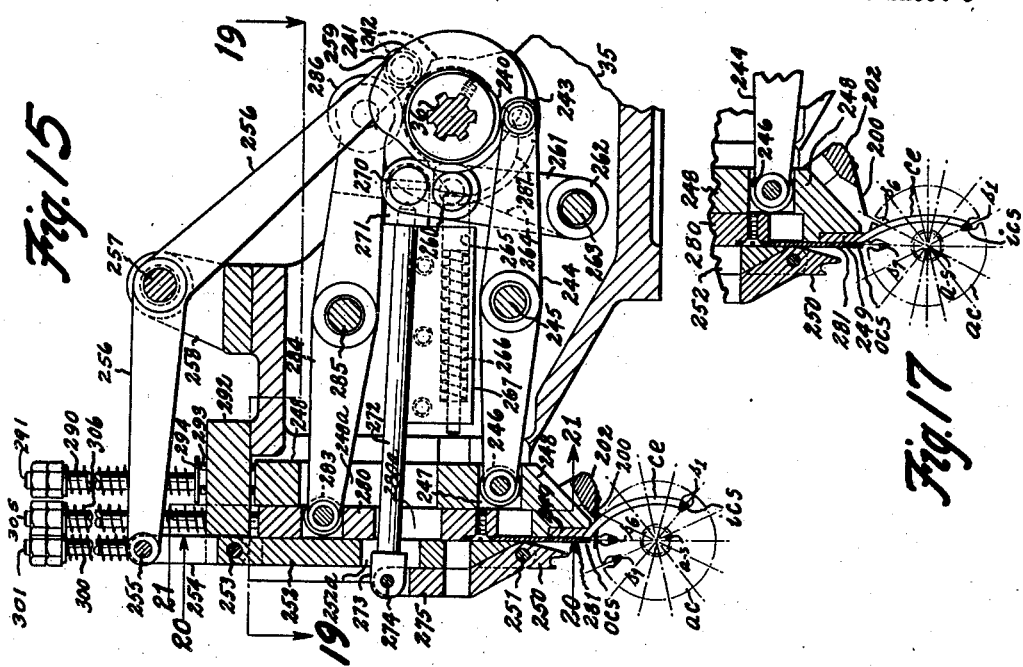
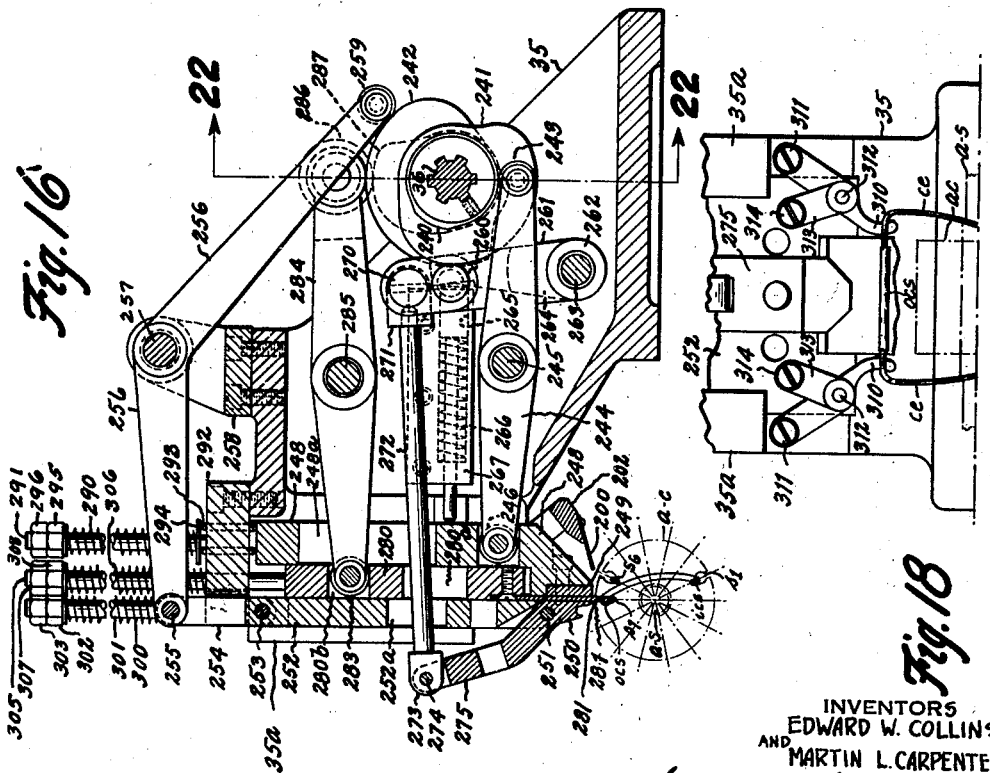

May 5, 1942.  E. W. COLLINS ET AL  2,281,917
ARMATURE ASSEMBLING MACHINE
Filed April 17, 1940  15 Sheets—Sheet 10

INVENTOR
EDWARD W. COLLINS
AND MARTIN L. CARPENTER
their ATTORNEYS

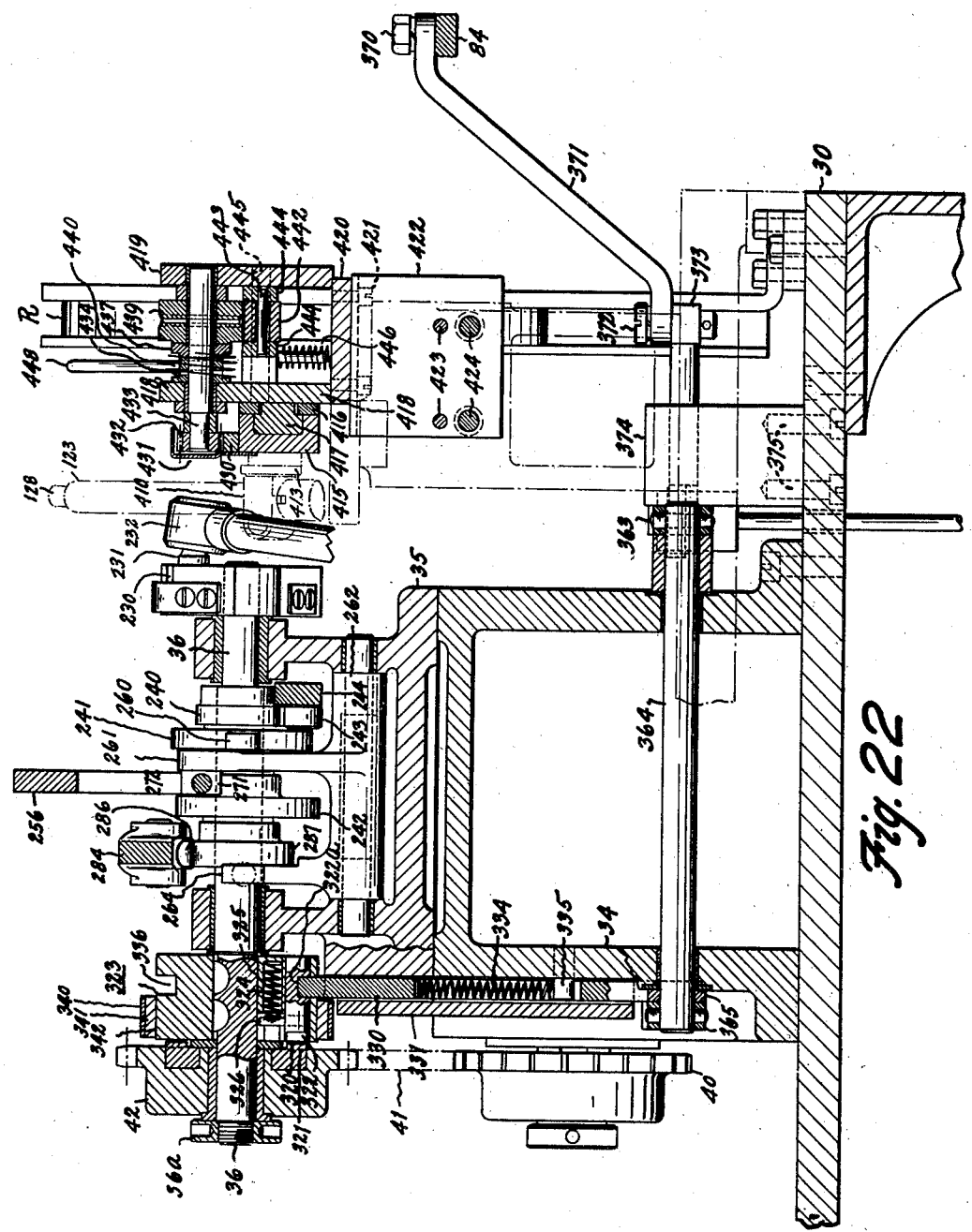

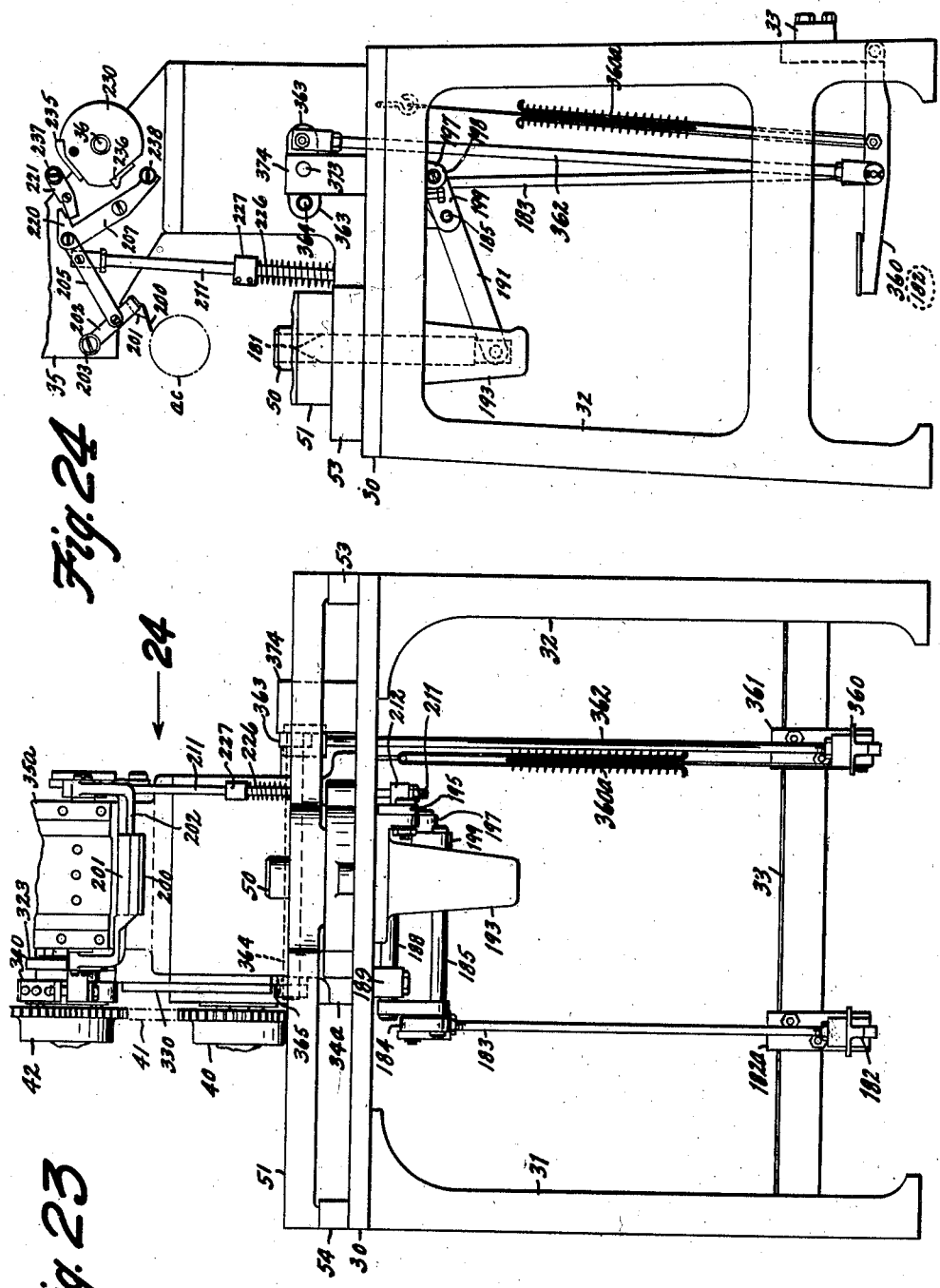

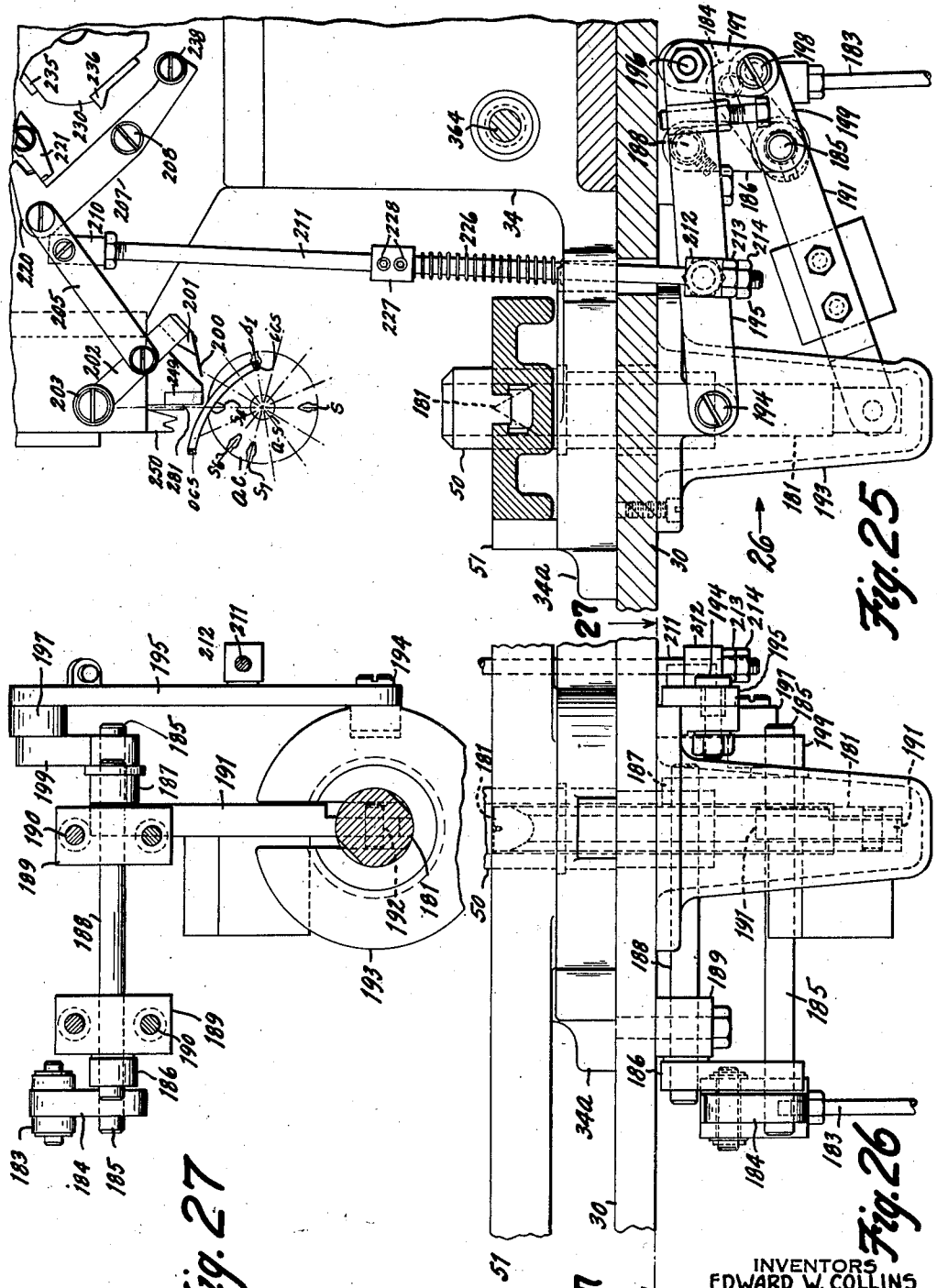

May 5, 1942.

E. W. COLLINS ET AL 2,281,917

ARMATURE ASSEMBLING MACHINE

Filed April 17, 1940

INVENTORS
EDWARD W. COLLINS
AND MARTIN L. CARPENTER by Spencer Hardman & Fehr

Their ATTORNEYS

May 5, 1942.   E. W. COLLINS ET AL   2,281,917
ARMATURE ASSEMBLING MACHINE
Filed April 17, 1940   15 Sheets-Sheet 15

INVENTORS
EDWARD W. COLLINS
AND MARTIN L. CARPENTER
BY

*their* ATTORNEYS

Patented May 5, 1942

2,281,917

UNITED STATES PATENT OFFICE 2,281,917

ARMATURE ASSEMBLING MACHINE

Edward W. Collins and Martin L. Carpenter, Anderson, Ind., assignors to General Motors Corporation, Detroit, Mich., a corporation of Delaware Application April 17, 1940, Serial No. 330,136

15 Claims. (Cl. 29—84)

This invention relates to the manufacture of armatures for dynamoelectric machines and more particularly to armatures which comprise the assembly of a slotted core and a plurality of preformed coils having parallel portions called "active coil sides," each slot of the core receiving active coil sides of different coils.

In the patent of Lora E. Poole, No. 2,192,801, granted March 5, 1940, there is disclosed a machine for operating upon a partially assembled armature. This partially assembled armature comprises the assembly of the core with armature coils, each having one of its active coil sides located in the bottom of a core slot. The purpose of this Poole machine is to locate the other active coil sides in the proper core slots. The Poole machine includes a chuck for gripping the armature shaft and power operated means for indexing or intermittently rotating the chuck through angular distances equal to the spacing of the core slots. At the end of each indexing operation the outer active coil side of a coil will be located against a guide plate and in radial alignment with that core slot which is to receive the coil side. Power operated mechanisms cause this coil side to be confined in a space slightly narrower than the throat of the slot and a blade pushes the coil side from this confined space and causes it to be inserted in the core slot above an active coil side which occupies the bottom part of the slot, meaning that part closer to the axis of the core. Before starting this Poole machine into operation the armature shaft is located and is caused to be gripped by the chuck in such position that one power operated indexing operation is performed by the machine before the first outer active coil side is inserted. During this first indexing operation this first outer active coil side is engaged by fingers which move with the outer active coil side as the core is indexed while at the same time resisting movement under spring tension so as to cause the coil to be stretched appreciably before this coil side is located against the guide plate which is in alignment with the proper core slot at the end of the indexing operation. Before this first indexing operation has been fully completed these fingers automatically release the first outer active coil side to allow it to move over against the guide plate. One purpose of these fingers is to keep this outer active coil side out of engagement with the core so that it will not accidentally be caught by the wrong core slot before the first indexing operation has been completed. After the first outer active coil side has been inserted in the proper slot, it is not necessary to use the stretching fingers of this Poole machine for the second and succeeding active coil sides to be inserted; therefore, the stretching-finger-device is manually moved out of the way so that it will not engage any active coil sides after the first one.

It is an object of the present invention to simplify the construction and mode of operation of the Poole machine and this object is accomplished by eliminating the stretching fingers and using, as the sole means for stretching the first coil as well as succeeding coils, the guide plate which cooperates to locate the outer active coil side in alignment with its proper core slot. In order to prevent contact between the first outer active coil side and the core and thus prevent accidental lodgment of that coil side with the improper core slot, we provide a thin plate of metal which is caused to cover that portion of the armature core adjacent to which the first outer active coil side is located, said plate being located between the core and the means for inserting the outer active coil sides therein. This plate will be termed hereinafter a "core guard."

It is a further object of the invention to control the core guard automatically in response to the operation of the other devices of the machine. One of these devices is a plunger which is used initially to locate the core in the proper position before causing the armature shaft to be gripped by the chuck. The depression of a pedal located beneath the machine causes this plunger to be elevated and its blade to enter between certain adjacent core teeth. This movement of the plunger is accompanied by movement of the core guard into position covering that portion of the core adjacent to which the first active coil side is located. The guard is latched in position. Then the armature shaft is gripped by the chuck and the plunger is lowered while the core guard remains in position. The chuck indexing means besides being power operated can be manually operated for a preliminary indexing operation. This preliminary indexing operation is effected by a lever, a manipulation of which causes the first coil to be partially stretched while the core is indexed through an angular distance twice the spacing of the adjacent core teeth, thus placing the first outer active coil side into alignment with that core slot next to the one into which the coil side is to be introduced. During this indexing operation the core remains covered by the core guard so that the first outer active coil side can not be accidentally caught by the wrong slot. Then the machine is caused to operate by motor power. Immediately the core is indexed to final position while the coil is finally stretched by power operation. During final indexing and before the coil inserting device operates, the core guard is automatically retracted.

A further object of the present invention is to provide for automatically centering the coils preparatory to inserting the outer active coil sides into the core slots.

Another object of the invention is to provide for the facile application of the rope insulation between the ends of the armature core and the end portions of the armature coils, the purpose of this insulation being to prevent short circuits between the bends in the armature coils which might otherwise occur due to slight undetectable damage of the insulation of the wires when the coils are stretched during the insertion of the outer active coil sides thereof. The use of such rope insulation is described and claimed in the Patent of Alva W. Phelps, No. 1,991,696, granted February 19, 1935.

Another object of the invention is to provide for the supplying of a strip of insulating paper to be placed around the armature shaft between the commutator and the core and thus around the leads from the inner active coil sides which have been previously connected with the commutator bars. To accomplish this object we provide means for feeding a strip of paper from a supply roll and for cutting it off to the proper length, said means being operated by the hand lever which is used to effect a preliminary coil stretching operation.

Further objects and advantages of the present invention will be apparent from the following description, reference being had to the accompanying drawings wherein a preferred embodiment of the present invention is clearly shown.

In the drawings:

Fig. 6 is a fragmentary front elevation of a work holder for supporting the armature assembly and for guiding the rope insulation thereto;

Fig. 7 is a plan view of the holder shown in Fig. 8;

Fig. 8 is an end view looking in the direction of the arrow 8 of Fig. 7;

Fig. 9 is a plan view of the paper feed and cut off device;

Fig. 10 is a side elevation of the paper feed and cut off device looking in the direction of the arrow 10 of Fig. 9;

Fig. 11 is a front elevation thereof looking in the direction of arrow 11 of Fig. 10;

Fig. 12 is a sectional view on the line 12—12 of Fig. 9;

Fig. 13 is a sectional view of the chuck which grips the armature shaft and is taken on the section line 13—13 of Fig. 3;

Fig. 14 is a sectional view substantially on the line 14—14 of Fig. 13;

Fig. 15 is a fragmentary sectional view on the line 15—15 of Fig. 3, showing the coil inserting parts in normal or retracted position;

Fig. 16 is a view similar to Fig. 15 showing the operating parts in position after having inserted a coil side in a slot;

Fig. 17 is a fragmentary view of certain parts shown in Figs. 15 and 16 and shows these parts in a position intermediate between the positions shown in Fig. 15 and the position shown in Fig. 16;

Fig. 18 is a fragmentary front view showing the coil centering mechanism in one of its operating positions;

Fig. 22 is a sectional view in part substantially on the line 22—22 of Fig. 16 and in part on the line 22a—22a of Fig. 9;

Fig. 23 is a diagrammatic front elevational view of the machine showing the clutch control and the core guard and core locator control;

Fig. 24 is a side elevation of the machine shown in Fig. 23 and is viewed in the direction of the arrow 24 of Fig. 23;

Fig. 25 is an enlarged view of the core guard and core locator devices shown in Fig. 24 of Fig. 23;

Fig. 26 is a view in the direction of arrow 26 of Fig. 25;

Fig. 27 is a sectional view on the line 27—27 of Fig. 26;

GENERAL CONSTRUCTION

Figure 1:
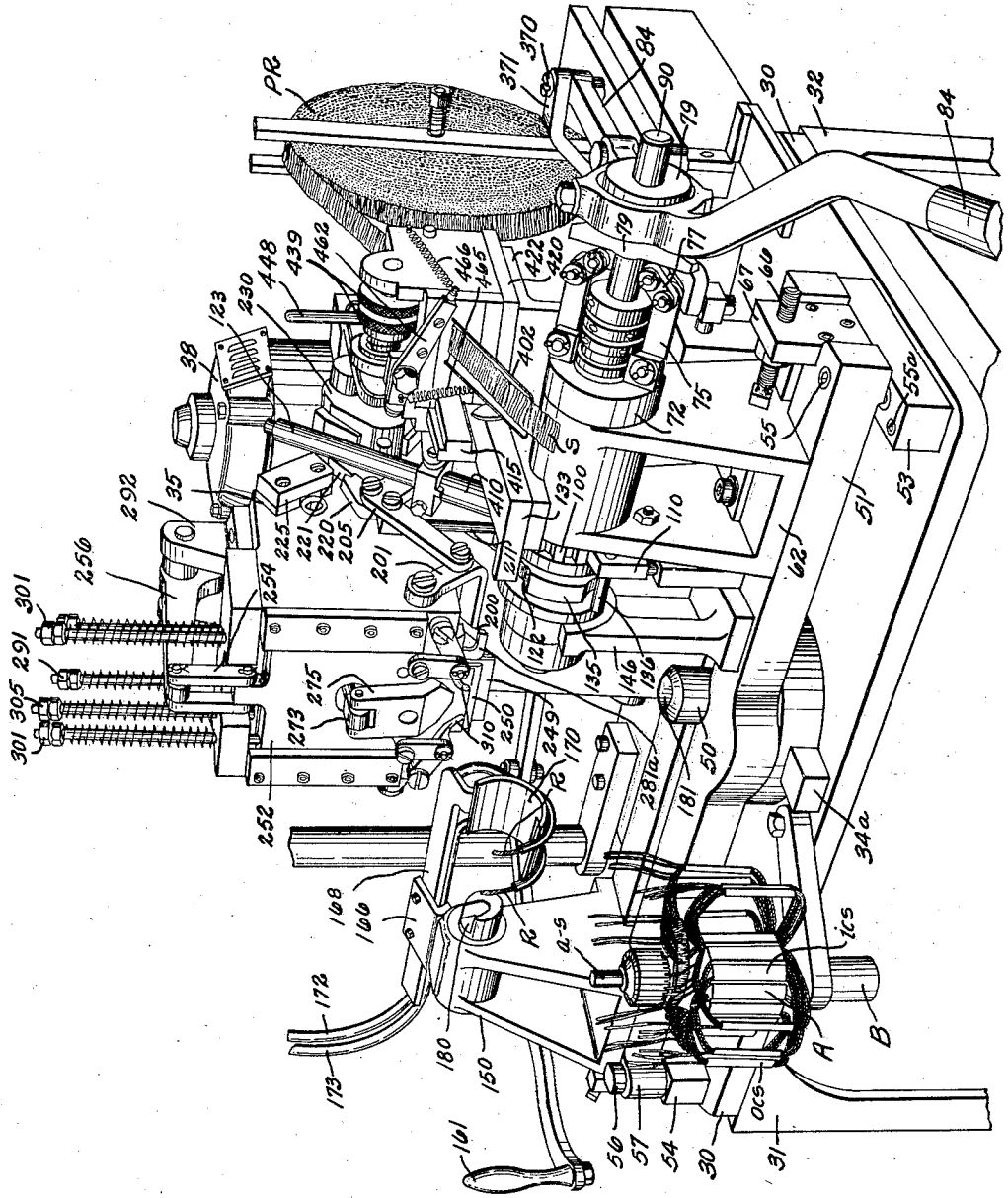
Fig. 1 is a perspective view of a machine embodying the present invention.
Figure 5:
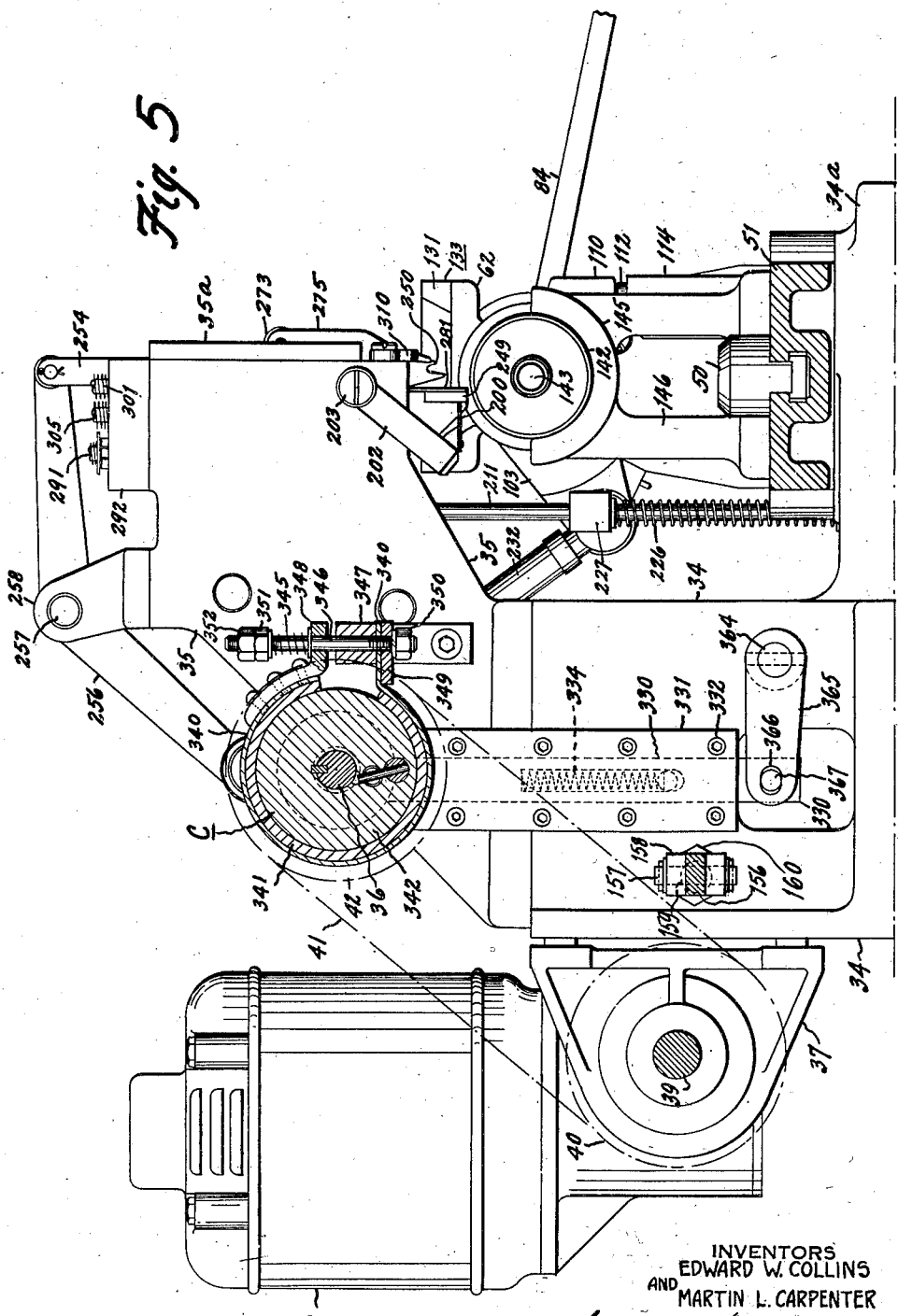
Fig. 5 is in part an elevational view looking in the direction of arrow 5 of Fig. 2, the sectional part being taken substantially on the section lines 5a—5a of Fig. 2.
Figure 20:
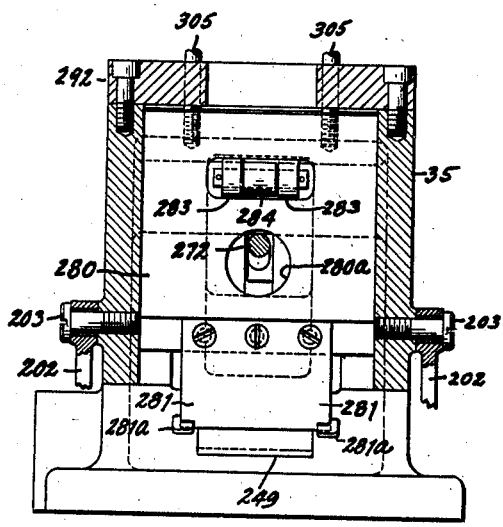
Fig. 20 is a sectional view on the vertical plane of points of arrow 20 of Fig. 15.
Figure 21:
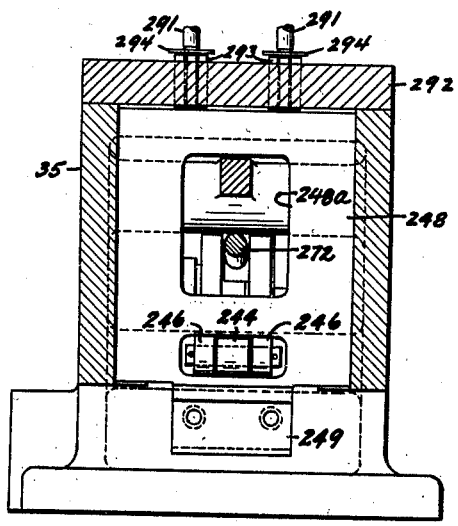
Fig. 21 is a sectional view on the line 21—21 of Fig. 15.
Figure 19:
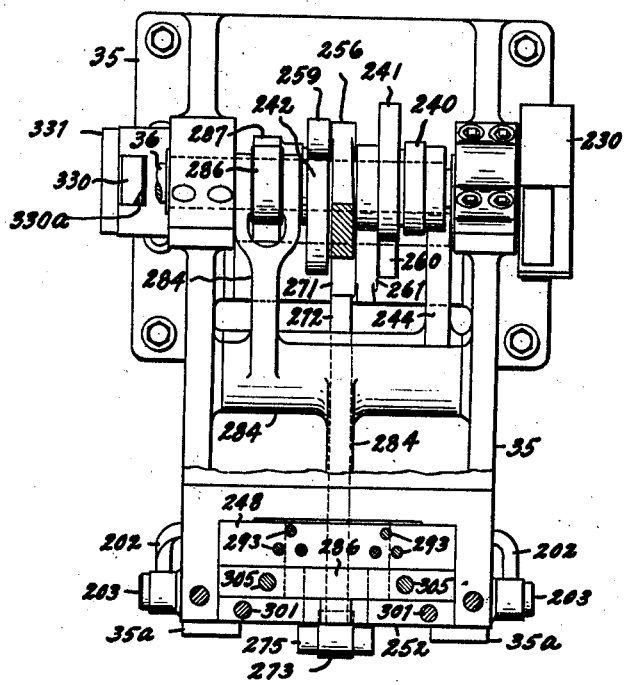
Fig. 19 is a sectional view on line 19—19 of Fig. 15.
Figures 28, 29:
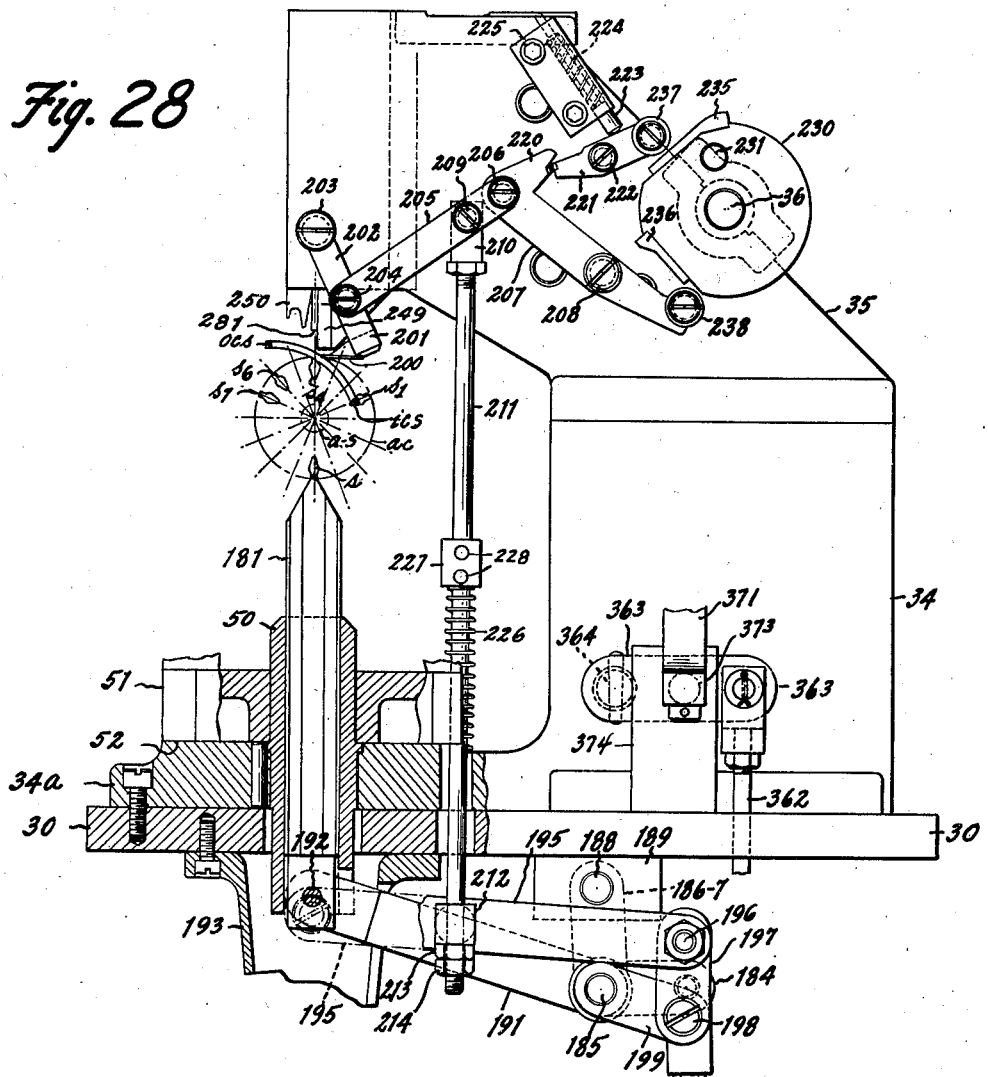
Fig. 28 is a view similar to Fig. 25 showing the core guard and core locator in operating position.
Fig. 29 is a fragmentary view showing the position of certain parts just at the instant of release of the core guard.

Referring to Figs. 23 and 24, the machine comprises a table or base 30 supported above the floor by leg frames 31 and 32 braced by a cross bar 33. The table 30 shown also in Fig. 28 supports a pedestal 34 carrying a bracket 35 which supports a cam shaft 36 carrying cams for operating the coil inserting mechanism to be described. As shown in Fig. 5, the pedestal 34 supports a frame 37 housing a gear reduction through which an electric motor 38, mounted on frame 37, drives a shaft 39. Shaft 39 drives a sprocket wheel 40 connected by a chain 41 with a sprocket wheel 42 journaled on the shaft 36 and connected therewith through a clutch C to be described. As shown in Fig. 28, the bracket 34 includes a forwardly extending base portion 34a which carries a vertically extending sleeve 50 providing a bearing around which an elongated sub-base 51 is rotatable. At its center the sub-base 51 is supported upon a pad 52 provided by the part 34a. At its ends the sub-base rests upon blocks 53 (see Fig. 2) and 54 (see Fig. 6). The ends of the sub-base 51 are secured to the blocks 53 and 54 by a locating screw 55 and a locating pin 56 respectively (Fig. 1). Pin 56 cooperates with one of a series of plain holes (not shown) in block 54, and screw 55 cooperates with one of a series of tapped holes 55a in block 53. In this way the sub-base 51 is secured to the table 30 in the desired position of adjustment with respect to the central sleeve 50 whereby the machine can be adapted to operate upon armatures having straight slotted cores or armatures having skew slotted cores.

Armature shaft chuck

Referring to Figs. 13 and 14, the sub-base 51 is provided with an inverted T-slot 60 through which a T-block or key 61 is slidable. Sub-base 51 supports a bracket 62 to which hard metal keys 63 are secured by screws 64. Keys 63 are received by the T-slot 60 in order to guide the bracket 62 for linear adjustment along the sub-base 51. Screw 65 passing through the bracket 62 threadedly engages the key 61. When these screws are tightened the bracket 62 will be clamped to the base 51 in the desired position. To facilitate making the proper adjustment of bracket 62, a stop screw 66 threaded through a plate 67 attached to the sub-base 51 may be turned in order to shift the bracket 62 toward the left. The screw 66 is screwed into desired position of adjustment by a lock nut 68. The bracket 62 rotatably supports a tubular shaft 70 which is located longitudinally by the bracket 62 by virtue of a shoulder 71 on the shaft engaging the left face of the bracket and by virtue of a nut 72 threaded into the shaft 70 and engageable with the right face of the bracket 62. The nut 72 is provided with pairs of ears 73 supporting pins 74 connected with link 75 which are connected through pins 76 with link 77, connected by pins 78 with a sleeve 79 having an annular groove 80. Groove 80 receives rollers 81 journaled on the ends of screws 82 carried by the bifurcations 83 of a chuck operating lever 84 which, as shown in Fig. 4, is pivotally supported on an extension 85 of bracket 82, said lever being rotatable about a screw 86 fixed to said extension. Movement of lever 84 about the screw pin 86 causes the sleeve 79 to move along a rod 90 which supports the sleeve 79 and which in turn is supported by the nut 72. Rod 90 is connected with a collet chuck member 91 having the usual spring fingers 92 each of which is provided with a conically tapered external surface cooperating with an internally tapered conical surface 93 provided at the left end of shaft 70. When the grooved sleeve 79 is moved toward the left into the position shown in Figs. 2, 3 and 13, the links 75 will move away from the rod 79 and the lugs 75a thereof will move toward the right. Lugs 75a are received by grooves in a nut 94 adjustable along the threaded portion 95 of rod 90, said nut 94 being secured in the desired position of adjustment of the lock nut 96. Therefore, when the sleeve 79 moves toward the left with the position shown in Fig. 13, the shaft 90 will move toward the right relatively toward the sleeve 70, thereby causing the collet members 92 to bind against the internally tapered surface 93 of sleeve 70 and thus to grip an armature shaft placed within the central bore 97 of the chuck 91 which is in alignment with the central bore 98 of rod 90 to provide clearance for the armature shaft. In this way the shaft of an armature to be operated upon may be readily fixed to the tubular shaft 70 by which the armature is rotated or indexed in the various positions. Shaft 70 drives the chuck 91 also through a pin 99 projecting into a groove 99a in chuck 91.

The shaft 70 provides a ratchet 100, the teeth of which may be engaged by a pawl 101 (Fig. 14) pivoted on a stud 102 mounted on a lever 103 having a hub 104 rotatable upon the exterior of shaft 70. Lever 103 carries a block 105 for supporting a plunger 106 urged by a spring 107 against the pawl 101. As viewed in Fig. 14, the ratchet 100 is turned by clockwise rotation of the lever 103. To prevent counterclockwise rotation of the pawl 101 when the lever 103 reverses its movements, there is provided a locking dog or pawl 110 pivoted on a stud 111 supported by the bracket 62 and urged into locking engagement by a plunger 112 biased by a spring 113, the plunger and spring being guided by a block 114 attached to the bracket 62.

The shaft 70 can be manually rotated in a clockwise direction when the ratchet 100 is engaged by a second pawl 120 which is slidable in a tubular lever 121 integral with a hub 122 journaled upon the hub 104 of lever 103. Lever 121 is threadedly connected with a tubular extension 123 which receives a sleeve 124 secured by a pin 125 and which receives a spring 126 surrounding a rod 127 attached at its upper end to the push button 128 (for moving pawl 100 into engagement with ratchet 120) and at its lower end to the pawl 120. The spring 126, being confined between the sleeve 124 and the button 128, urges the pawl 120 upwardly. The upward movement of the pawl is limited by a pin 129 carried by the lever 121 and extending into a slot 130 provided by the pawl 120. The lever 121 moves between stop lugs 131 and 132 (Fig. 14) provided by a plate 133 attached by screw 134 to the bracket 62 (Fig. 13). During the motion of lever 121—123 from the stop 131 toward the stop 132 the operator presses the button 128 to cause the pawl 120 to engage the ratchet 100. When lever 121 is moved toward the stop 131 a cam 135 provided by the hub 122 of said lever engages a pin 136 carried by the locking dog 110 whereby said dog is moved out of engagement with the ratchet 100. It is not necessary that the dog 110 engage the ratchet during manual counterclockwise rotation of the hub 122 because the latch is already locked against this rotation by the pawl 101 carried by the lever 103. During a substantial part of the return, clockwise movement of the lever 121—123 from the stop 131 toward stop 132, the dog 110 will be maintained out of engagement with the ratchet 100 so as to facilitate the manual indexing of the ratchet 100. At the end of the movement of lever 121—123 toward the stop 132 the cam 135 releases the pin 136 so that the dog 110 will reengage the ratchet 100 and thus locate the shaft 70 and the armature chuck 91 driven thereby in the desired position. Since the spring 113 which urges the dog 110 into locking engagement with the ratchet 100 is relatively stiff and since the cam 135 maintains the dog 110 out of engagement with the ratchet 100 during most of the indexing movement of the lever 121—123, it is apparent that the manual indexing of the armature shaft has been facilitated.

The hub 122 of the lever 121 is confined between a flange of the hub 104 of lever 103 and a bearing 140 which is clamped against a shoulder 141 of the shaft 70 by a nut 142 threadedly engaging the left end of shaft 70 providing a central opening 143 to receive the armature shaft. The bearing 140 is supported in a U-shaped cradle 145 integral with a pedestal 146 supported by the sub-base 51 and guided therealong by key 147 received by the groove 60. A screw 148 extends through the bracket 146 threadedly engaging the key 147 by tightening the screw 148. The bracket 146, like the bracket 62, is secured in the desired position with respect to the base 51.

Armature tail stock

Referring to Figs. 6, 7 and 8, it will be seen that the sub-base 51 supports a bracket 150 which is slidable along the base 51 and is guided thereby through the use of a key 151 (Fig. 8) which is secured by screw 152 to the bracket 150. For convenience in moving the bracket 150 along the base 51, there is provided a lever 153. Attached to the bracket 150 by screw stud 154 affixed to an extension 150a of the bracket, said lever 153 being connected by a screw 155 with a link 156 (Fig. 3). Link 156 (Fig. 5) is connected by a pin 157 with the bifurcation 158 of a screw 159 threaded into the bracket 34 and locked therein by lock nut 160. The lever 153 carries a handle 161 which the operator grasps when moving the bracket 150 along the base 51 toward or away from the armature shaft supporting chuck which has been described with reference to Figs. 13 and 14. Screw 67a adjustably secured to plate 66a limits movement of bracket 150 to the left (Fig. 6).

Figure 30:
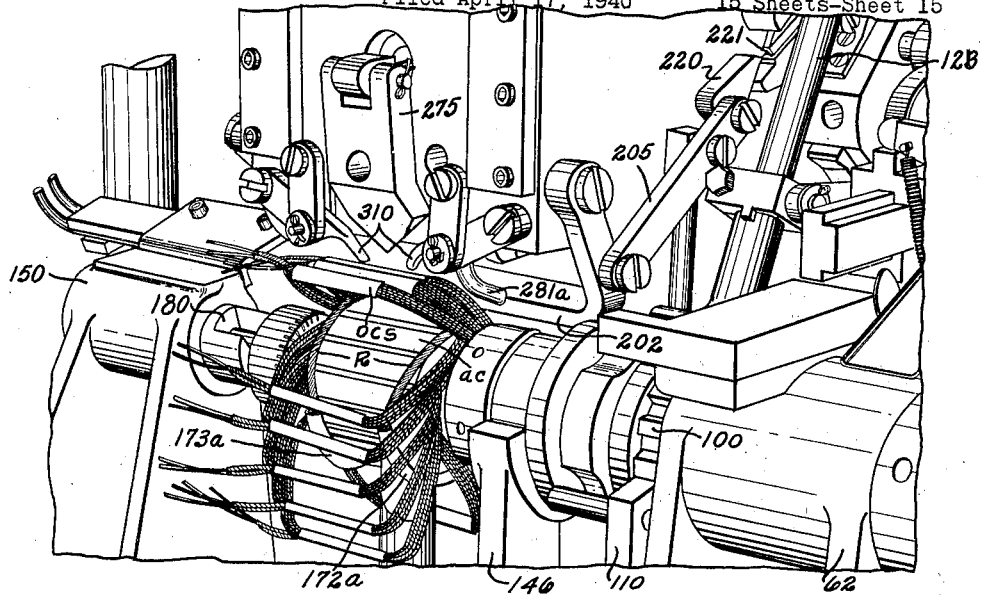
Figs. 30 and 31 are fragmentary perspective views showing certain operations.
Figure 31:
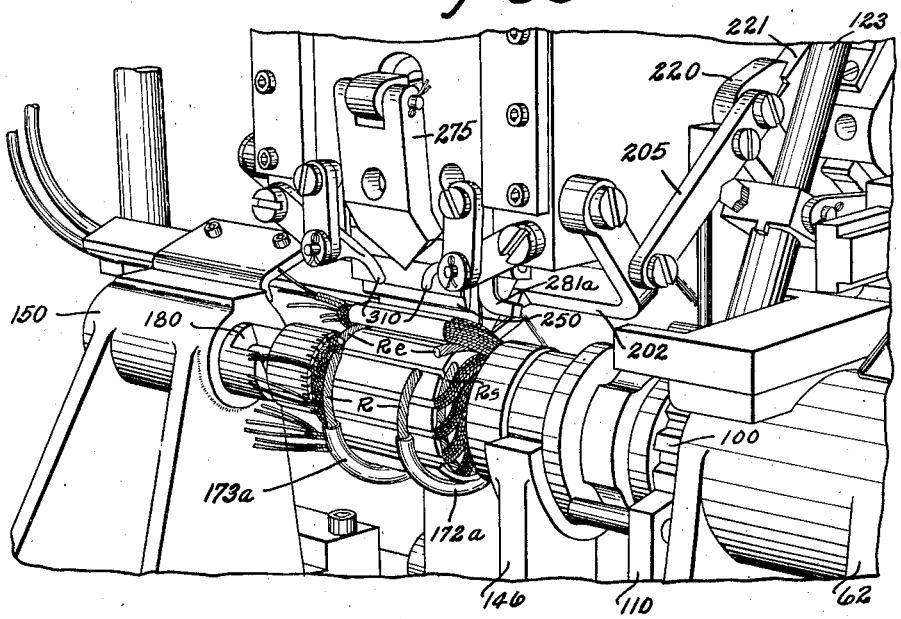

Referring to Fig. 8, screws 165 secure the bracket 150 and angle bracket 166 to which screws 167 secure a bar 168 terminating at its right hand end in a pad 169 to which a cylindrical plate 170 is secured by screws 171. The plate 170 provides a cradle for supporting the armature core. Tubes 172 and 173 are secured intermediate their ends to the underside of bar 168 by clips 174 and rivets 175. The tubes 172 and 173 are provided at their left ends with flared bushings 176 and 177 into which non-conducting ropes R are introduced as shown in Fig. 1. The right hand ends of the tubes 172 and 173 terminate in arcuate portions 172a and 173a out of which the insulating ropes R emerge as these ropes are pulled through by the operator and applied to armature assembly, as shown in Figs. 30 and 31.

The bracket 150 supports a rod 178 attached to the bracket by pin 179 and provided with a recess 180 for receiving the left end of the armature shaft. While the bracket 150 is in the position shown in Fig. 1, the armature A shown therein supported upon a bracket B is first placed in position with its armature core ac received by the cradle 170 and the left-hand end of armature shaft a—s received by the rod 178. When the operator moves the lever 153 counterclockwise, as viewed in Fig. 7 to cause the bracket 150 to move into the position shown in Figs. 2, 3 and 7, the armature core ac is located directly over the sleeve 50 and the locating plunger 181 supported thereby, as shown in Figs. 25, 16, 17 and 28, and the right end of the armature shaft a—s is received by the chuck 91 preparatory to its gripping the armature shaft a—s after the core has been properly located.

Armature coil locator and core guard

Referring to Figs. 25 through 29 and more particularly to Figs. 25 and 28, an armature core represented by dot-dash line circle ac has been located so that one of its slots s receives the locating pin 181 which has been moved upwardly from the position shown in Fig. 25 to that shown in Fig. 28 in response to the depression of a pedal 182 (Fig. 23) pivotally supported by the cross bar 33 and connected by rod 183 with a lever 184, fixed to a shaft 185. Shaft 185 is supported by links 186 and 187 (Fig. 27) which are carried by a rod 188 passing through brackets 189 attached by bolts 190 to the bottom of the table 30. Shaft 188 is fixed to a lever 191 connected by pin 192 with the notched lower end of the locating pin 181. The lower end of the pin 181 and its connection with the lever 191 are protected by a guard 193. Guard 193 supports screw 194 which provides a pivot for a lever 195 connected with a link 197 through a bolt 196. Link 197 is connected by a bolt 198 with a lever 199 fixed to the shaft 185. When the pedal 182 is depressed, the rod 183 moves downwardly, thereby producing clockwise rotation of lever 191 and upward movement of the core locator 181, so that its point will be received by a certain core slot s of the armature core ac.

The core slot which is vertically above and diametrically opposite the slot s which receives locator 181 is marked $s_4$ because it is the slot #4 beginning the count from the slot $s_1$ which already receives an inner active coil side isc. The outer coil side ocs of this coil is to be introduced into slot $s_7$ which is the seventh from slot $s_1$ beginning the count with slot $s_1$. In order that the coil side ocs be not accidentally lodged in slot $s_6$ which, as the result of a preliminary indexing operation, will be located vertically uppermost, it is necessary to provide for the covering of this slot $s_6$ by a plate 200 which we call a core guard. The core guard 200 is mounted upon the yoke 201 of a U-shaped lever having its arms 202, Fig. 2, pivoted upon screw studs 203, attached to the frame 35. The right hand arm 202 is connected by screw 204 with link 205 connected by screw 206 with lever 207 pivoted on screw 206 attached to frame 35. Lever 205 is connected by screw 209 with block 210 threadedly connected with rod 211 which passes through a plain hole in a block 212 attached to lever 195. The lower end of rod 211 is threaded to receive nuts 213 and 214 adjustable therealong. Referring to Fig. 25, in which the normal position of the core guard 200 and its operating mechanism are shown as well as the normal position of the core locator 181, it will be seen that the upward movement of the locator 181 from the position shown in Fig. 25 to that shown in Fig. 28, will be accompanied by a downward movement of lever 195 and of rod 211, thereby causing the link 207 and the guard 200 to move from the positions shown in Fig. 25 to those shown in Fig. 28. When these movements occur, the link 205 and the lever 207 become latched in a position for maintaining the core guard 200 over the slot $s_4$. This latching means comprises cooperating latch pawls 220 and 221, the former being a part of lever 207 and the latter being a separate piece, pivoted upon a screw stud 222, fixed to the frame 35. The pawl 221 is urged clockwise into engagement with pawl 220 by a plunger 223 pressed downwardly by spring 224, said plunger and spring being carried by a block 225 attached to frame 35. Similarly, the pawl 220 is urged toward the pivot 222 of the pawl 221 by a spring 226 surrounding the rod 211 and confined between the foot 34a of pedestal 34 and a collar 227 adjustable along the rod 211 and fixed thereto in the desired position of adjustment by screws 228.

The latch provided by the pawls 220 and 221 for maintaining the core guard 200 in the position shown in Fig. 28, does not retain the core locator 181 in the upper position for the reason that only a one-way operating connection is provided between the rod 211 and the lever 195, the latter being movable upwardly without requiring that the rod 211 also move upwardly. After the armature core ac has been located by the pin 181 in a slot s vertically below slot s4 (counting from and beginning with slot s1) containing the inner coil side of the first coil whose outer coil side is to be positioned in a core slot and after the chuck 91 has been caused by movement of lever 84 to grip the armature shaft to maintain the core ac in this same location, the operator may then release the pedal 182 to permit the pin 181 to move downwardly while the lever 195 moves upwardly without restraint from the rod 211. The core guard 200 can not be unlatched and returned to its normal position until after the machine shaft 36 begins to rotate.

Before the machine is power operated, the attendant pulls lever 123 against stop 131 (Fig. 14), presses button 128 to cause pawl 20 to engage ratchet 100, moves lever 123 against stop 132 and release button 128. This latter movement of lever 123 causes the armature core ac to rotate clockwise to locate slot s6 vertically uppermost as seen in Fig. 15.

The machine is now ready for operation by motor power. By a suitable clutch to be described later, the electric motor 38 is connected with cam shaft 36. Referring to Figs. 4 and 28, the direction of rotation of shaft 36 is counterclockwise. Shaft 36 carries a crank disc 230, carrying a pin 231 which is connected by a link 232 adjustable in length and connected at its lower end by a pin 233 with the pawl operating lever 223. Fig. 28 and Fig. 4 show the crank disc 230 in its normal and home position. As the disc 230 begins to rotate counterclockwise, the final indexing of the core ac begins as a result of downward movement of link 232 which produces clockwise movement of pawl lever 103 (Fig. 14). As the disc 230 rotates for this purpose, it carries hardened steel wear pieces or cams 235 and 236 into engagement, respectively, with rollers 237 and 238 attached respectively to the levers 207 and 221. This effects the separation of the pawls 220 and 221 as shown in Fig. 29 whereupon, due to the action of spring 226 acting upwardly on rod 211, the levers 205 and 207 and guard 200 are returned to normal position as shown in Fig. 25. The final indexing of the core ac brings slots s7 into uppermost position as shown in Fig. 17.

It is, therefore, apparent that before the insertion of any outer active coil sides of the armature core ac, the core is covered by a guard 200 automatically in response to the elevation of the core locating pin 181 and that the core guard 200 remains latched in this position until the final indexing movement of the armature core takes place resulting in the location of the core slot s7 which is to receive the first outer active coil side ocs. After the first outer active coil side ocs has been inserted in a core slot, there is no further need to cover a slot of the core as since there is no danger that any succeeding outer active coil side will be accidently caught by or lodged in the wrong core slot. Therefore, during the final indexing of the core preparatory to receiving the first outer active coil side, the core guard 200 is automatically retracted just before the first outer active coil side is inserted.

Coil side inserting device

Figure 2:
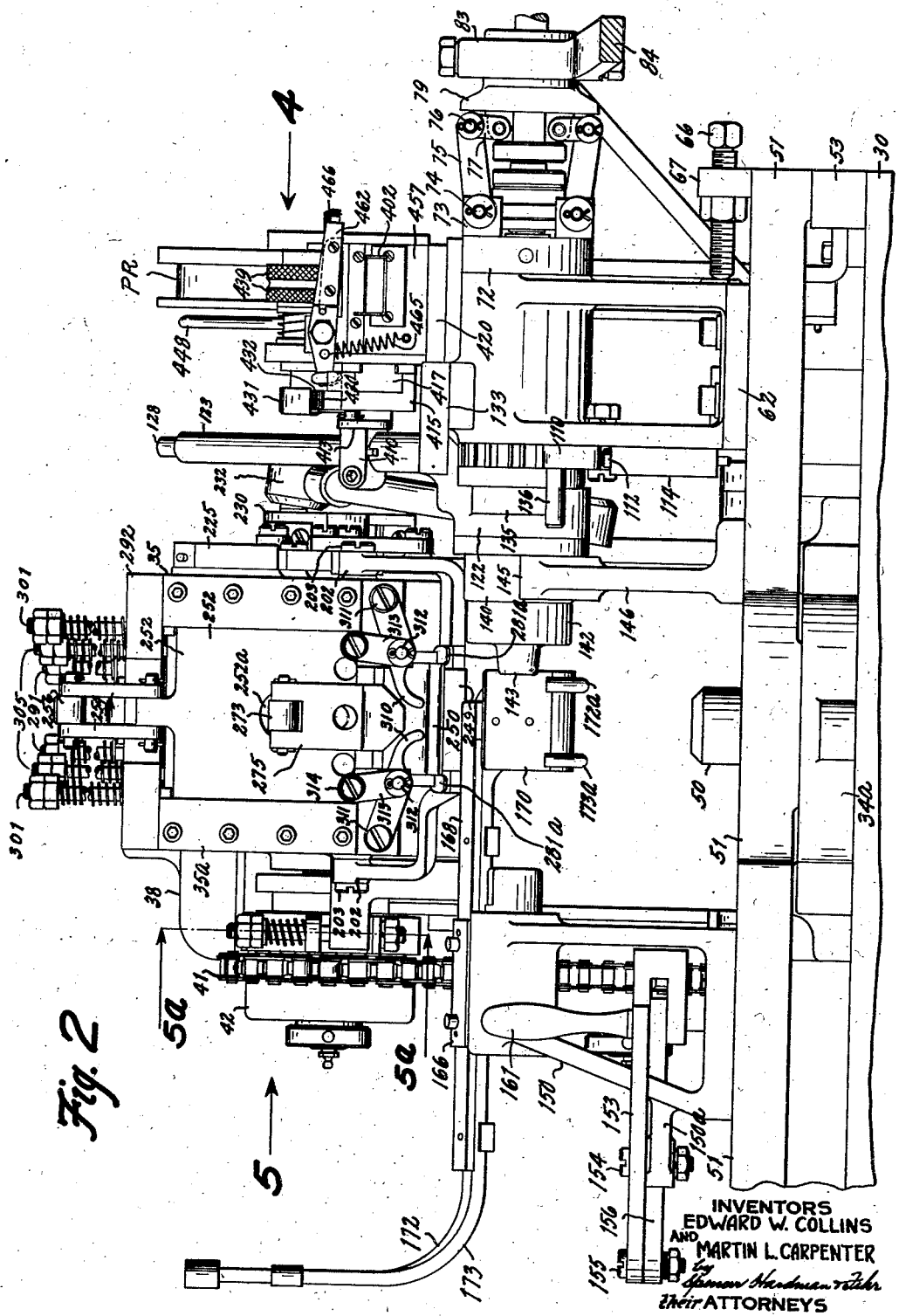
Fig. 2 is a front elevation, the chuck operating handle being broken away.
Figure 3:
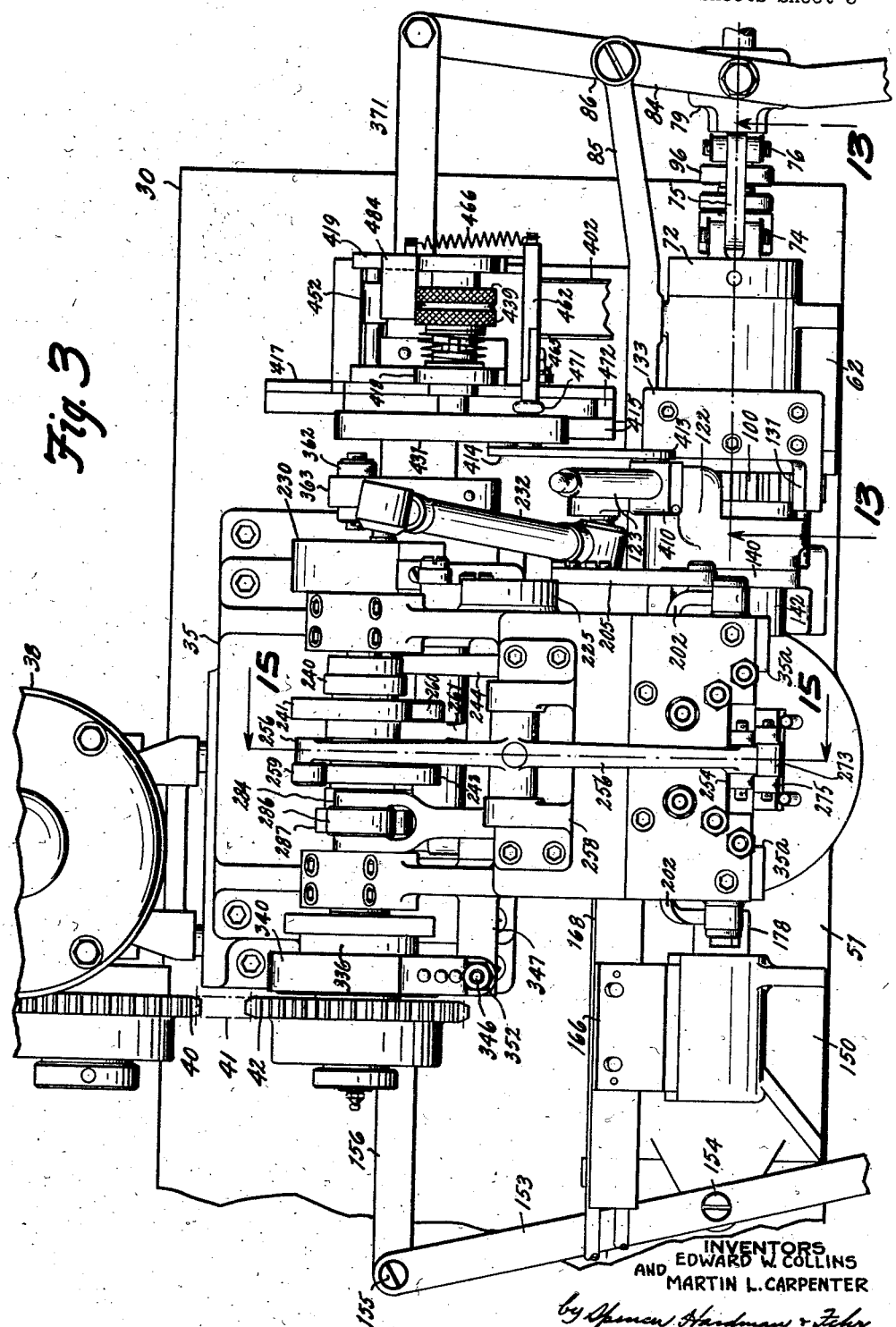
Fig. 3 is a plan view of the machine shown in Fig. 2.
Figure 4:
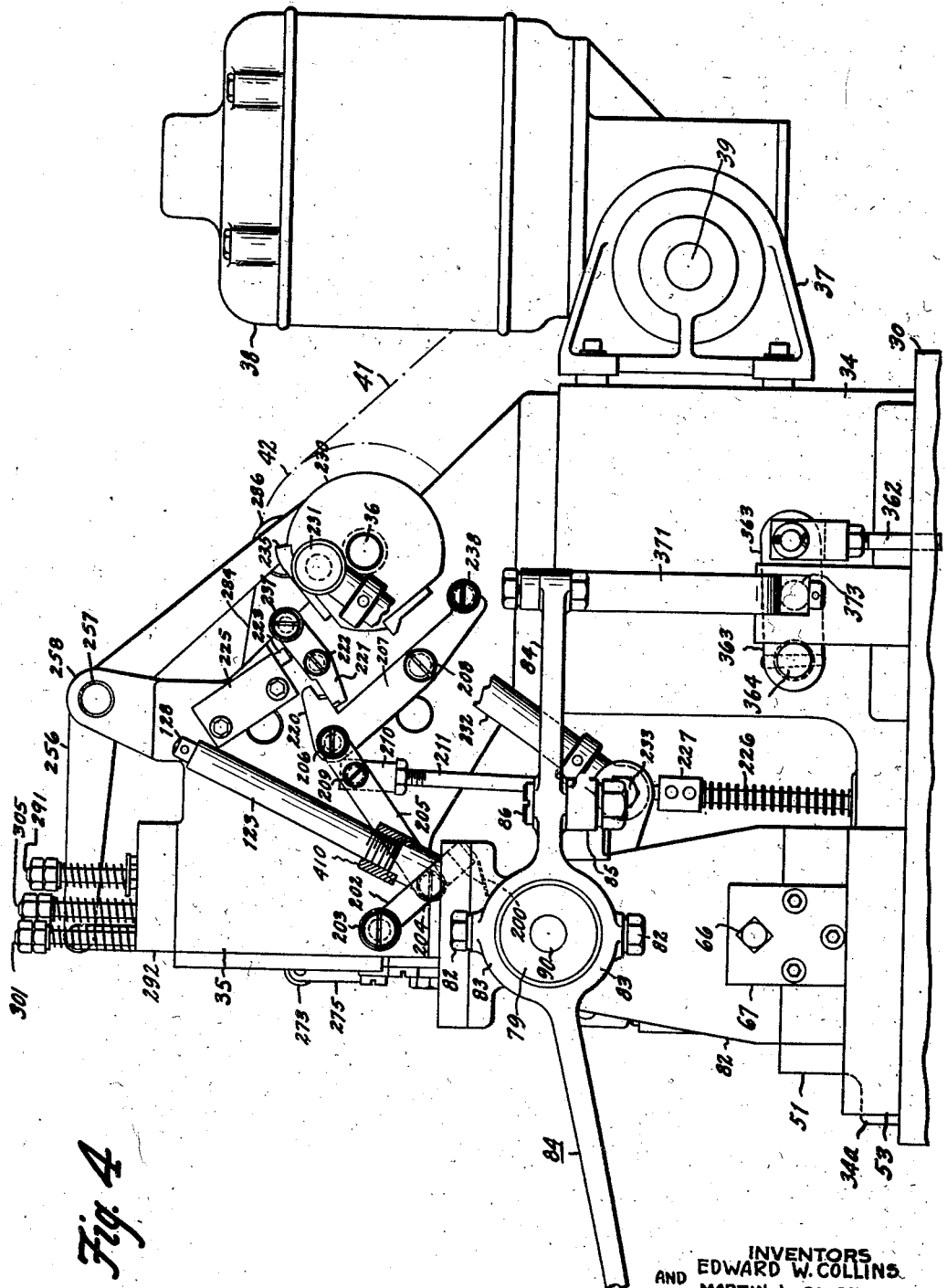
Fig. 4 is an elevational view in the direction of the arrow 4 of Fig. 2.

Referring to Figs. 15 through 22, as well as Figs. 2 and 3, it will be seen that the shaft 36 which is journaled in bearings carried by the frame 35, supports and drives cams 240, 241 and 242. Cam 240 cooperates with a cam follower roller 243 carried by lever 244 which rotates on a rod 245 and which carries a roller 246 received within a recess 247 provided by a slide 248 carrying a blade 249 against which an outer coil side ocs of an armature coil is pressed during the indexing of the core ac which produces movement of the inner coil side ics in a clockwise direction. The indexing of the core will naturally stretch the coil particularly the end portions thereof indicated ce in Fig. 15. In order that the outer coil side ocs will enter in armature slot without tearing the insulation of the wires, it is necessary that it be confined in a space at least slightly narrower than the width of the throat of the core slot. This space is determined by the spacing of the blade 249 and of a bar 250, which is moved from the position shown in Fig. 15 ultimately to that shown in Fig. 16 preparatory to inserting the coil side ocs in a core slot. To accomplish this, the bar 250 is pivoted on a pin 251 carried by a slide 252 which is connected by pin 253 with links 254 connected by pin 255 with a lever 256, journaled on a rod 257 carried by bracket 258 attached to frame 35. Lever 256 carries a roller 259 which cooperates with the cam 242 in such a manner that, during rotation of shaft 36, the lever 256 oscillates to effect vertical movement of slide 252. While this happens the bar 250 is caused to oscillate about its pivot 251 through a mechanism which includes the cam 241, a cam follower 260 carried by a lever 261 having a hub 262 journaled on a rod 263 supported by frame 35. The hub 262 has a lever extension 264 which is engaged by plunger 265 urged by spring 266 toward the right in Fig. 15, said plunger and spring being supported by a block 267 attached to the frame 35. Lever 261 carries a pin 270 pivotally supporting a block 271 connected by a rod 272 with a head 273 connected by pin 274 with a lever 275 integral with the plate 250. The rod 272 passes through aperture 248a in slide 248 and through aperture 252a in slide 252 and through aperture 280a in a slide 280 which carries the coil inserting plate 281. Slide 280 has a recess 280b which receives a roller 283 carried by lever 284 journaled on a shaft 285 and carrying a roller 286 which cooperates with the cam 242. The slide 248 is urged normally downwardly by a plurality of springs 290, surrounding rods 291, fixed to a bar 292, attached to frame 35. Bar 292 is apertured to receive slidable pins 293 resting upon the slide 248 at their lower ends. At their upper ends these pins 293 are engaged by discs 294 respectively engaged by the springs 290 which are confined in a state of compression between the upper surface of the bar 292 and the nuts 295 and 296 attached in pairs to the threaded rods 291. The slide 248 being urged downwardly by springs 290, the lever 244 is urged counterclockwise so that its cam follower, roller 243 always engages the cam 240. The slide 252 is urged normally upwardly by a plurality of springs 300 surrounding rods 301 fixed at their lower ends to the slide 252 and carrying at their upper ends nuts 302 and 303 which confine the springs 300 in a state of compression. Therefore the slide 252 is urged normally upwardly, thereby urging its actuating lever 256 clockwise, thereby causing the roller 259 always to bear against the cam 242. The slide 280 is urged normally upwardly in the same manner that 252 is urged upwardly.

For this purpose, the slide 280 is connected with rods 305 surrounded by springs 306, confined in a state of compression by nuts 307 and 308, threaded on the upper ends of the rods 305. The springs 306 urge the lever 284 clockwise, thereby causing its roller 286 always to engage the cam 287.

The four cams 240, 241, 242 and 287 are so coordinated that, immediately following the final indexing of the core, the blade 249 will first move downwardly to a position but slightly spaced from the core, the core guard 200 having been automatically returned to normal position shown in Fig. 17. The bar 250 will move into the coil side confining location, shown in Fig. 16 and then the plate 281 will move down between the bars 249 and 250 to move an outer coil side ocs into a core slot. During movement of plate 281 its side extensions or lugs 281a (Fig. 20) engage portions of the coil ends ce to compress them toward the core.

The downward movement of the slide 252 effects the operation of the means for centering the next outer coil side to be inserted. Referring to Figs. 2 and 18, this centering means comprises a pair of fingers 310 pivoted on screw studs 311 carried by the frame 35 and each having a pin 312 which is connected by link 313 and a screw 314 with the slide 252. As the slide 252 is moved downwardly from the position shown in Fig. 2 to that shown in Fig. 18, the fingers 310 are caused to engage the next coil to be operated upon and locate its outer active coil side ocs centrally with respect to the armature core ac. The centering of the coils with respect to the core insures that all of the end portions of the coils will overlie the end discs of the core in exactly the same relation.

Clutch and operating mechanism

Referring more particularly to Figs. 5, 22 and 23 and 24, the drive sprocket 42 normally loosely journaled on the shaft 36 carries a hardened clutch ring 320 having a notch or notches 321 for receiving a clutch dog 322 which is carried by a cylindrical block 323 connected to the shaft 36. The dog 322 is slidable in a direction parallel to the shaft 36 and is urged toward the clutch ring 320 by a spring 324 confined in a recess 325 and engaging a pin 326 carried by the dog 322. In order to retract the pin 322 from engagement with the clutch ring 320 there is provided a stationary slide 330 guided by a channelled plate 331 attached by screws 332 to the pedal 34 and to the bracket 35. The slide 330 is urged upwardly by spring 334 resting at its lower end upon a pin 335, fixed to the pedestal 34. The upper end of slide 330 is received by an annular groove 336 in the block 323. The upper end of the slide 330 is also engageable in a notch 322a provided in dog 322. The engaging surfaces of this notch 322a and the upper portion of the slide 330 are so tapered that, responsive to movement of the slide 330 into the groove 336, the dog 322 will be automatically retracted from engagement with the driving clutch ring 320, therefore, the shaft 336 will be disconnected from the driving motor 38.

The shaft 36 is immediately brought to rest after disengagement of the clutch members 320 and 322 by means of a brake comprising a brake band 340 having a lining 341 for engaging a disc 342, provided by the block 323. The amount of friction created by the brake band lining 341 is controlled by a spring 345 surrounding a rod 346 which is fixed to a lug 347, extending from the frame 35. The upper end of the rod 346 passes through a lug 348 attached to the band 340. The lower end of the rod 346 passes through the band 340 and through reenforcing plate 349 which together with the bar 340 is held in place by a nut 350 threaded on the lower end of the rod 346. The upper end of the rod 346 carries nuts 351 and 352 by which the compression of the spring 345 may be adjusted.

To start the machine into operation by power from the motor, the operator depresses a pedal 360 pivotally supported by a plate 361 carried by the cross-bar 33 (Fig. 24). When the pedal 360 moves downwardly, it pulls a rod 362 downwardly, thereby effecting clockwise rotation of an arm 363 and a shaft 364 (clockwise in Fig. 24). Referring to Fig. 5, in which this movement of shaft 364 appears counterclockwise, the downward movement of pedal 360 results in counterclockwise rotation of lever 365 pinned to shaft 364. Lever 365 being provided with a slot 366 for receiving a pin 367 attached to the lower end of slide 330, the downward movement of pedal 360 effects downward movement of slide 330, thereby freeing it of engagement with the clutch dog 322, whereupon the spring 324 will be released to move the dog 322 into engagement with the driving ring 320. Therefore, so long as the operator continues to press the pedal downwardly, the cam shaft 36 will continue to rotate to perform successive indexing operation of the armature core alternating with successive operations of inserting outer active coil sides into the core slots.

The control of the clutch is coordinated with the control of the chuck operating lever 84. Referring to Figs. 4 and 22, lever 84 is connected by bolt 370 with a link 371 connected by a screw 372 with a rod 373 slidable horizontally in a block 374, attached by screws 375 to the table 30. When the pedal 360 is in its normal position, the lever 363 locates a hole therein, in alignment with the rod 373. When the chuck shaft lever 84 is not in such position as to cause the chuck to grip the armature shaft, said position being shown best in Fig. 1, the pin 373 controlled by the position of lever 84 will be in locking engagement with the lever 363. Therefore, the clutch can not be closed until after the lever 84 has been moved to cause the chuck to grip the armature shaft.

Strip insulation feeding and cut-off device

Referring to Fig. 1, it will be seen that strip insulation wound on supply reel PR, supported between two brackets 400 and 401, has been fed to a chute 402 where a length or strip S has been cut off. This strip S is placed around the armature assembly supported on a bracket 402, attached to the table 30 preparatory to placing it in the machine. This strip S is used to insulate the leads from the inner active coil sides which are connected to the commutator 403. The feeding of strip insulation and the severing of a length S is effected in response to movement of the handle 123 which is oscillated incidentally to the preliminary indexing of the armature core in preparation for receiving the first outer active coil side. For this purpose, it is mounted upon the handle 23, a tubular block 410 which is gripped about the handle 123 by the tightening of a screw 411. Block 410 carries a stud 412 providing a pivotal connection with a link 413, connected by screw stud 414 with a channeled bar 415 carrying plates 416 cooperating with the channel in the bar 415 to provide a T-groove receiving a track 417 of T-shape cross-section. Track 417 is mounted on a plate 418 which together with a similar plate 419 is welded to a base plate 420, attached by screws 421 to an angle bracket 422, fixed to the bracket 62 by dowels 423 and screws 424.

The slide bar 415 carries a rack 430 and a rack guard 431. The rack 430 meshes with a pinion 432 fixed to a shaft 433 journaled in bearings provided by the plates 418 and 419. Shaft 433 drives a disc 434 having tongues 435 engageable with notches 436 in a one-way clutch driving member 437 having a tongue 438 received in a notch provided by knurled roller 439 freely journaled on the shaft 433 but not directly connected therewith except through the clutch plate 437 and the driving disc 434. A spring 440 urges the plate 437 against the roller 439. The paper strip which is fed from the slide roll R is passed under the roller 439 and is pressed thereagainst by an idle roller 442 mounted on a pin 443 carried by bifurcated lever 444 pivoted on a rod 445 carried by the plates 418 and 419. The lever 444 is urged upwardly by spring 446 surrounding a rod 447 attached to the lever, said spring bearing at its lower end against the plate 420. The lever 444 can be moved downwardly against the compression of the spring 446 by pressing down on a rod 448 attached to the lever. The lever 444 is provided with a groove 450 to provide a track for the paper strip, said groove being covered by a plate 451, attached to the lever. The groove 450 receives a roller 452 mounted on a rod 453 carried by the plates 418 and 419.

The paper strip passes from right toward left through the channel 450, then between the rollers 409 and 442, then through a slot 455 provided by a block 456 welded to a plate 457, in turn welded to the plates 418, 419 and 420. The plate 457, 457 carries a stationary shear blade 460 cooperating with a movable shear blade 461 carried by lever 462 comprising parts 462a and 462b and pivoted upon the plate 457. The lever 462 is urged counterclockwise by spring 465 and 466. Spring 465 is connected between a stud 467 attached to lever 462 and a stud 468, attached to plate 457. Spring 466 is connected by the stud 469 attached to lever 462 and a stud 470, attached to plate 419. These springs tend to return the shear blade 461 to normal position, thus opening the passage 455 and they also urge a roller 471 attached to lever 462 against a cam plate 472 mounted upon the upper surface of the bar 415. As the bar 415 is moved toward the operator when he pulls the handle 123 towards him, a length of paper is fed from the reel PR by the coaction of rollers 439 and 442 and directed down upon the chute 402. When the operator returns the handle 123 to its normal position, shown in Fig. 1, the bar 415 is caused to move from the left toward right (Figs. 9 and 12), thereby causing the pinion to turn in a counterclockwise direction, as viewed in Fig. 12. However, the roller 439 is not driven counterclockwise because it is held against rotation by a ball 480 urged by spring 481 into a detent 482 located below the surface of a groove 483 provided by the roller 439 for receiving the ball 480. The ball 480 and the spring 481 are carried by a plate 484 fixed to the plate 419. Hence, the roller 439 rotates only clockwise as viewed in Fig. 12 to feed the paper toward the left. It does not feed the paper toward the right. Toward the end of the travel of the bar 415 toward the right (Figs. 9 and 12) the lobe of the cam 472 engages the roller 471, thereby causing the lever 462 to rotate clockwise (Fig. 11) thereby causing the blade 461 to move downwardly (Fig. 12) to cooperate with the blade 460 to shear the paper, thus producing the strip S, shown in Fig. 1.

Fig. 30 shows the condition of the machine before power has been applied to effect the final indexing prior to inserting the first inner active coil side. The arm 202 is advanced toward the armature core $ac$ to cause the core guard to cover the uppermost core slot. The insulating ropes R have been pulled out through the guide tube ends 173a and 172a and have been located under the armature coils and adjacent the ends of the armature core.

Fig. 31 shows the condition of the machine after all but two or three of the outer active coil sides $ocs$ have been inserted. Before continuing with the work, the ropes R are cut as shown, leaving rope ends Re to be tucked, together with the rope start portion Rs, down between the armature coils and the core ends.

Upon completion of the work, the lever handles are moved respectively, toward the right and toward the left to free the armature shaft from the indexing chuck so that the armature assembly operated upon may be removed and be replaced by another assembly to be operated upon by the machine.

Sequence of the first cycle of operation

*No. I.*—Operator places the armature assembly in the machine as shown in Fig. 30. The outer coil sides of certain armature coils are separated by a gap occupied by the coil inserting devices. Certain outer coil sides are in front of or to the left of plate 281 in Fig. 25, the others are to the right of and below the part 200. The operator turns the armature core $ac$ so that a certain slot $S_4$ (Fig. 25), which is three slot spaces away from the slot $S_1$ containing the inner coil side $ics$ of that coil having its outer coil side $ocs$ nearest to the left of plate 281, will be uppermost and adjacent to plate 281.

*No. II.*—Operator presses a pedal which elevates part 181 and lowers part 211 as shown in Fig. 28. Part 181 locates the core $ac$ while the chuck is caused to grip the armature shaft. Downward movement of part 211 causes the core guard 200 to cover slot $S_4$ and the latch parts 220 and 221 to cooperate to retain the guard 200 in this position. Operator releases pedal to allow 181 to descend so that the core can be indexed by turning the chuck. Since the pedal has only a one-way (pull-down) connection with the rod 211, part 181 can descend while the core guard remains latched.

*No. III.*—Before connecting the machine with the power source, the operator manually indexes the core $ac$ clockwise to bring to uppermost position a slot $S_6$ which is five slot spaces from slot $S_1$ containing the inner coil side $ics$ of the coil whose outer coil side $ocs$ is then engaging the plate 249. The manual indexing of the core through the chuck causes the coil to be stretched and there is a tendency to pull the coil side $ocs$ toward the core $ac$. Guard 200 prevents the coil side $ocs$ from being caught by the core teeth sides defining slot $S_6$.

*No. IV.*—The operator causes a clutch to connect the power source with the machine. The first operations performed by the machine, when power operated, are to index the core $ac$, clockwise, to locate the slot $S_7$ in alignment with inserting blade 281, and outer coil side ocs in alignment with slot $S_7$, and concurrently therewith to disable the latch (provided by parts 220 and 221) so that a spring will be permitted to retract the guard 200.

No. V.—The power operations described in item IV are followed by downward movement of guides 249 and 250 and movement of the latter toward the former, and the descent of the blade 281 to cause outer coil side ocs to be inserted in slot $S_7$. Power indexing of the core and power insertion of the other outer coil sides continues automatically until operator opens the clutch.

While the embodiment of the present invention as herein disclosed, constitutes a preferred form, it is to be understood that other forms might be adopted, all coming within the scope of the claims which follow.

What is claimed is as follows:

1. A machine for operating upon an armature assembly comprising a shaft carrying a slotted core in each slot of which there is located an inner active side of an armature coil, said machine comprising means for rotatably supporting the armature; means at a predetermined location for successively receiving the outer coil sides and for guiding them into core slots, said means arresting movement of the outer coil side in order that the coil will be stretched somewhat during the indexing of the armature core; means at that location for successively inserting the outer coil sides into the core slots; means for indexing the armature for the purpose of presenting successive core slots in operative relation to the means for inserting; centering means adapted to be operatively associated with each end of the outer coil side; and means for moving said centering means for engagement with one or the other of the end portions of the coil depending on its location with respect to said centering means, and for moving said centering means effectively in a direction longitudinally of and away from the core in order to shift the outer coil side, to be inserted, longitudinally with respect to the core for the purpose of equalizing the extent to which the coil end portions extend beyond the core ends.

2. A machine according to claim 1 in which the centering named means comprises fingers movable against the inside parts of the coil end portions near where said coil end portions join the outer coil side.

3. A machine according to claim 1 in which the coil centering means is operatively connected directly with the coil receiving and guiding means so as to be actuated concurrently therewith.

4. A machine for operating upon an armature assembly comprising a shaft carrying a slotted core in each slot of which there is located an inner active side of an armature coil, said machine comprising means for rotatably supporting the armature; means at a predetermined location for successively receiving the outer coil sides and for guiding them into core slots, said means arresting movement of the outer coil side in order that the coil will be stretched somewhat during the indexing of the armature core; means at that location for successively inserting the outer coil sides into the core slots; means for indexing the armature for the purpose of presenting successive core slots in operative relation to the means for inserting; and means located at each end of the core for guiding a strip of insulating material in rope-like form to each end of the core so that starting end portions of the strips may be located between the coil end portions and the core ends, said insulating strips being thereafter moved with respect to their guiding means by the indexing of the core.

5. A machine according to claim 4 in which the means for rotatably supporting the armature comprises a tail stock movable axially of the armature with respect to a fixed head stock; in which the armature indexing means operates through a chuck for gripping the armature shaft and supported by the head stock; and in which the means for guiding the insulating strips comprises guide tubes supported by the tail stock.

6. A machine according to claim 4 in which the means for rotatably supporting the armature comprises a fixed head stock and a tail stock movable axially of the armature with respect to the head stock; said tail stock carrying an arcuate plate for receiving the armature core; in which there is a chuck, supported by the head stock, through which the armature indexing means operates to grip the armature shaft; and in which the means for guiding the insulating strips comprises guide tubes supported by the tail stock and curved around the outside of said arcuate plate.

7. A machine for operating upon an armature assembly comprising a shaft carrying a slotted core in each slot of which there is located an inner active side of an armature coil, said machine comprising means for rotatably supporting the armature; means at a predetermined location for successively receiving the outer coil side and for guiding them into core slots, said means arresting movement of the outer coil side in order that the coil will be stretched somewhat during the indexing of the armature core; means at that location for successively inserting the outer coil sides into the core slots; means for indexing the armature for the purpose of presenting successive core slots in operative relation to the means for inserting, said means including a ratchet connected with the armature and an oscillatable pawl for intermittently moving the ratchet in one direction; a locking pawl for preventing movement of the ratchet in the opposite direction; power operated means for causing the indexing means and the inserting means to operate alternately in recurrent sequence; and a manually operable device adapted to be operated before the first power indexing operation for moving the indexing ratchet to bring into alignment with the inserting means that core slot which is one core tooth space ahead of the core slot into which the first outer coil side is to be inserted, said manually operable device including a rotatable lever and means adapted to detachably connect the lever to the indexing ratchet.

8. A machine for operating upon an armature assembly comprising a shaft carrying a slotted core in each slot of which there is located an inner active side of an armature coil, said machine comprising means for rotatably supporting the armature; means at a predetermined location for successively receiving the outer coil sides and for guiding them into core slots, said means arresting movement of the outer coil side in order that the coil will be stretched somewhat during the indexing of the armature core; means at that location for successively inserting the outer coil sides into the core slots; a chuck for gripping the armature shaft; means for indexing the armature for the purpose of presenting successive core slots in operation relative to the means for inserting, said indexing means including a ratchet connected with the chuck and an oscillatable pawl for intermittently moving the ratchet in one direction; a locking pawl for preventing movement of the ratchet in the opposite direction; a locator for engaging the core between certain teeth thereof to retain the core in such position that the core slot then in alignment with the inserting means is a predetermined number of core tooth spaces ahead of the core slot into which the first outer coil side is to be inserted; means for causing the chuck to grip the armature shaft in order to retain the core in said position through the cooperation of the ratchet, when connected with the chuck, and the locking pawl, when engaging the ratchet, thereby permitting release of the locator; and a manually operable device adapted to be operated before the first power indexing operation for moving the indexing ratchet to bring into alignment with the inserting means that core slot which is one core tooth space ahead of the core slot into which the first outer coil side is to be located, said manually operable device including a rotatable lever and means adapted to detachably connect the lever with the indexing ratchet.

9. A machine for operating upon an armature assembly comprising a shaft carrying a slotted core in each slot of which there is located an inner active side of an armature coil, said machine comprising means for rotatably supporting the armature; means at a predetermined location for successively receiving the outer coil sides and for guiding them into core slots, said means arresting movement of the outer coil side in order that the coil will be stretched somewhat during the indexing of the armature core; means at that location for successively inserting the outer coil sides into the core slots; means for indexing the armature for the purpose of presenting successive core slots in operative relation to the means for inserting, said means including a ratchet connected with the armature and an oscillatable pawl for intermittently moving the ratchet in one direction; a locking pawl for preventing movement of the ratchet in the opposite direction; power operated means for causing the indexing means and the inserting means to operate alternately in recurrent sequence; a guard movable between the inserting means and the core to prevent the first outer coil side to be inserted from being caught by core tooth portions defining a slot ahead of the slot intended to receive said first outer coil side; means for moving the guard into operating position before the power indexing starts; a manually operable device operated before the first power indexing operation for moving the indexing ratchet to bring into alignment with the inserting means that core slot which is one core tooth space ahead of the core slot into which the first outer coil side is to be inserted; and means responsive to the first power indexing operation for effecting retraction of the guard.

10. A machine for operating upon an armature assembly comprising a shaft carrying a slotted core in each slot of which there is located an inner active side of an armature coil, said machine comprising means for rotatably supporting the armature; means at a predetermined location for successively receiving the outer coil sides and for guiding them into core slots, said means arresting movement of the outer coil side in order that the coil will be stretched somewhat during the indexing of the armature core; means at that location for successively inserting the outer coil sides into the core slots; a chuck for gripping the armature shaft; means for indexing the armature for the purpose of presenting successive core slots in operation relative to the means for inserting, said means including a ratchet connected with the chuck and an oscillatable pawl for intermittently moving the ratchet in one direction; a locking pawl for preventing movement of the ratchet in the opposite direction; a locator for engaging the core between certain teeth thereof to retain the core in such position that the core slot then in alignment with the inserting means is a predetermined number of core-tooth spaces ahead of the core slot into which the first outer coil side is to be inserted; a guard movable between the inserting means and the core to prevent the first outer coil side to be inserted from being caught by core tooth portions defining a slot ahead of the slot intended to receive said first outer coil side; means for moving the locator into and out of operating position and having a one-way connection with the guard whereby the latter is concurrently moved into operating position; means for causing the chuck to grip the armature shaft in order to retain the core in said position through the cooperation of the ratchet connected with the chuck and the locking pawl engaging the ratchet, thereby permitting release of the locator; a manually operable device operated before the first power indexing operation for moving the indexing ratchet to bring into alignment with the inserting means that core slot which is one core tooth space ahead of the core slot into which the first outer coil side is to be located; and means responsive to the first power indexing operation for effecting retraction of the guard.

11. A machine for operating upon an armature assembly comprising a shaft carrying a slotted core in each slot of which there is located an inner active side of an armature coil, said machine comprising means for rotatably supporting the armature; means at a predetermined location for successively receiving the outer coil sides and for guiding them into core slots, said means arresting movement of the outer coil side in order that the coil will be stretched somewhat during the indexing of the armature core; means at that location for successively inserting the outer coil sides into the core slots; means for indexing the armature for the purpose of presenting successive core slots in operative relation to the means for inserting, said means including a ratchet connected with the armature and an oscillatable pawl for intermittently moving the ratchet in one direction; a locking pawl for preventing movement of the ratchet in the opposite direction; power operated means for causing the indexing means and the inserting means to operate alternately in recurrent sequence; a guard movable between the inserting means and the core to prevent the first outer coil side to be inserted from being caught by core tooth portions defining a slot ahead of the slot intended to receive said first outer coil side; a spring biased to retain the core guard in non-operating position; means for moving the guard into operating position against the action of said spring before power indexing starts; a latch for retaining the guard in operating position; a manually operable device operated before the first power indexing operation for moving the indexing ratchet to bring into alignment with the inserting means that core slot which is one core tooth spaced ahead of the core slot into which the first outer coil side is to be inserted; and means responsive to the first indexing operation for disabling the latch thereby permitting the spring to retract the guard.

12. A machine for operating upon an armature assembly comprising a shaft carrying a slotted core in each slot of which there is located an inner active side of an armature coil, said machine comprising means for rotatably supporting the armature; means at a predetermined location for successively receiving the outer coil sides and for guiding them into core slots, said means arresting movement of the outer coil side in order that the coil will be stretched somewhat during the indexing of the armature core; means at that location for successively inserting the outer coil sides into the core slots; a chuck for gripping the armature shaft; means for indexing the armature for the purpose of presenting successive core slots in operative relation to the means for inserting, said means including a ratchet connected with the chuck and an oscillatable pawl for intermittently moving the ratchet in one direction; a locking pawl for preventing movement of the ratchet in the opposite direction; a locator for engaging the core between certain teeth thereof to retain the core in such position that the core slot then in alignment with the inserting means is a predetermined number of core-tooth spaces ahead of the core slot into which the first outer coil side is to be inserted; a guard movable between the inserting means and the core to prevent the first outer coil side to be inserted from being caught by core tooth portions defining a slot ahead of the slot intended to receive said first outer coil side; a spring biased to retain the core guard in non-operating position; means for moving the locator into and out of operating position and having a one-way connection with the guard whereby the latter is concurrently moved into operating position; a latch for retaining the guard in operating position; means for causing the chuck to grip the armature shaft in order to retain the core in said position through the cooperation of the ratchet connected with the chuck and the locking pawl engaging the ratchet, thereby permitting release of the locator; a manually operable device operated before the first power indexing operation for moving the indexing ratchet to bring into alignment with the inserting means that core slot which is one core tooth space ahead of the core slot into which the first outer coil side is to be located; and means responsive to the first indexing operation for disabling the latch thereby permitting the spring to retract the guard.

13. A machine for operating upon an armature assembly comprising a shaft carrying a slotted core in each slot of which there is located an inner active side of an armature coil, said machine comprising means for rotatably supporting the armature; means at a predetermined location for successively receiving the outer coil sides and for guiding them into core slots, said means arresting movement of the outer coil side in order that the coil will be stretched somewhat during the indexing of the armature core; means at that location for successively inserting the outer coil sides into the core slots; means for indexing the armature for the purpose of presenting successive core slots in operative relation to the means for inserting; a guard movable between the inserting means and the core to prevent the first outer coil side to be inserted from being caught by core tooth portions defining a slot ahead of the slot intended to receive the first outer coil side; means for moving the guard into operating position before power indexing starts; and means responsive to the first power indexing operations for effecting retraction of the guard.

14. A machine for operating upon an armature assembly comprising a shaft carrying a slotted core in each slot of which there is located an inner active side of an armature coil, said machine comprising means for rotatably supporting the armature; means at a predetermined location for successively receiving the outer coil sides and for guiding them into core slots, said means arresting movement of the outer coil side in order that the coil will be stretched somewhat during the indexing of the armature core; means at that location for successively inserting the outer coil sides into the core slots; means for indexing the armature for the purpose of presenting successive core slots in operative relation to the means for inserting; a guard movable between the inserting means and the core to prevent the first outer coil side to be inserted from being caught by core tooth portions defining a slot ahead of the slot intended to receive the first outer coil side; a spring biased to retain the guard in non-operating position; means for moving the guard into operating position before power indexing starts; a latch for retaining the guard in operating position against the action of the spring; and means responsive to the first power indexing operation for disabling the latch thereby permitting the spring to retract the guard.

15. A machine for operating upon an armature assembly comprising a shaft carrying a slotted core in each slot of which there is located an inner active side of an armature coil, said machine comprising means for rotatably supporting the armature; means at a predetermined location for successively receiving the outer coil sides and for guiding them into core slots, said means arresting movement of the outer coil side in order that the coil will be stretched somewhat during the indexing of the armature core; means at that location for successively inserting the outer coil sides into the core slots; means for indexing the armature for the purpose of presenting successive core slots in operative relation to the means for inserting; a guard movable between the inserting means and the core to prevent the first outer coil side to be inserted from being caught by core tooth portions defining a slot ahead of the slot intended to receive the first outer coil side; means for moving the guard into operating position before power indexing starts; means responsive to the first power indexing operation for effecting retraction of the guard; and means to be operated before the first indexing operation for so locating the armature core that the inserting means is in alignment with that core slot which is one tooth space ahead of the core slot into which the first outer coil side is inserted.

EDWARD W. COLLINS.
MARTIN L. CARPENTER.